(12) United States Patent
Nakashima

(10) Patent No.: US 11,061,513 B2
(45) Date of Patent: Jul. 13, 2021

(54) METHOD FOR CONTROLLING DISPLAY DEVICE, AND DISPLAY DEVICE

(71) Applicant: SEIKO EPSON CORPORATION, Tokyo (JP)

(72) Inventor: Akihiro Nakashima, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/829,459

(22) Filed: Mar. 25, 2020

(65) Prior Publication Data

US 2020/0310591 A1    Oct. 1, 2020

(30) Foreign Application Priority Data

Mar. 26, 2019  (JP) .............................. JP2019-057883

(51) Int. Cl.
| | |
|---|---|
| *G06F 3/042* | (2006.01) |
| *G06F 3/0481* | (2013.01) |
| *G09G 3/00* | (2006.01) |
| *G06F 3/038* | (2013.01) |

(52) U.S. Cl.
CPC ........ *G06F 3/0425* (2013.01); *G06F 3/04817* (2013.01); *G09G 3/001* (2013.01); *G06F 3/0386* (2013.01)

(58) Field of Classification Search
CPC ... G06F 3/0425; G06F 3/04817; G09G 3/001; G09G 3/003

USPC ......................................... 345/163, 174, 175
See application file for complete search history.

(56) References Cited

U.S. PATENT DOCUMENTS

| | | | |
|---|---|---|---|
| 9,489,080 B2* | 11/2016 | Seo ........................ | G06F 3/0484 |
| 2014/0009501 A1 | 1/2014 | Kim et al. | |
| 2015/0153948 A1* | 6/2015 | Booking ............. | G06F 3/04883 |
| | | | 715/802 |
| 2015/0365306 A1* | 12/2015 | Chaudhri ............ | G06F 3/04886 |
| | | | 715/736 |
| 2016/0274781 A1* | 9/2016 | Wilson .................... | G06F 16/58 |
| 2018/0292951 A1 | 10/2018 | Kato et al. | |
| 2019/0132460 A1* | 5/2019 | Sawano ............. | H04N 1/00474 |

FOREIGN PATENT DOCUMENTS

| | | |
|---|---|---|
| JP | H03-132693 A | 6/1991 |
| JP | 2003-084750 A | 3/2003 |
| JP | 2014-014075 A | 1/2014 |
| JP | 2017-224985 A | 12/2017 |
| WO | 2017/110505 A1 | 6/2017 |

* cited by examiner

*Primary Examiner* — Calvin C Ma
(74) *Attorney, Agent, or Firm* — Oliff PLC

(57) ABSTRACT

A projector displays an image based on an inputted image signal, in a sub screen on a screen along with a pin icon. The projector displays an image based on another inputted image signal, in another sub screen on the screen along with another pin icon. When the pin icon is selected, the projector stores the image based on the image signal into a capture memory. When the another pin icon is selected, the projector stores the image based on the another image signal into the capture memory. The projector displays the image stored in the capture memory onto the screen.

7 Claims, 16 Drawing Sheets

FIG. 15
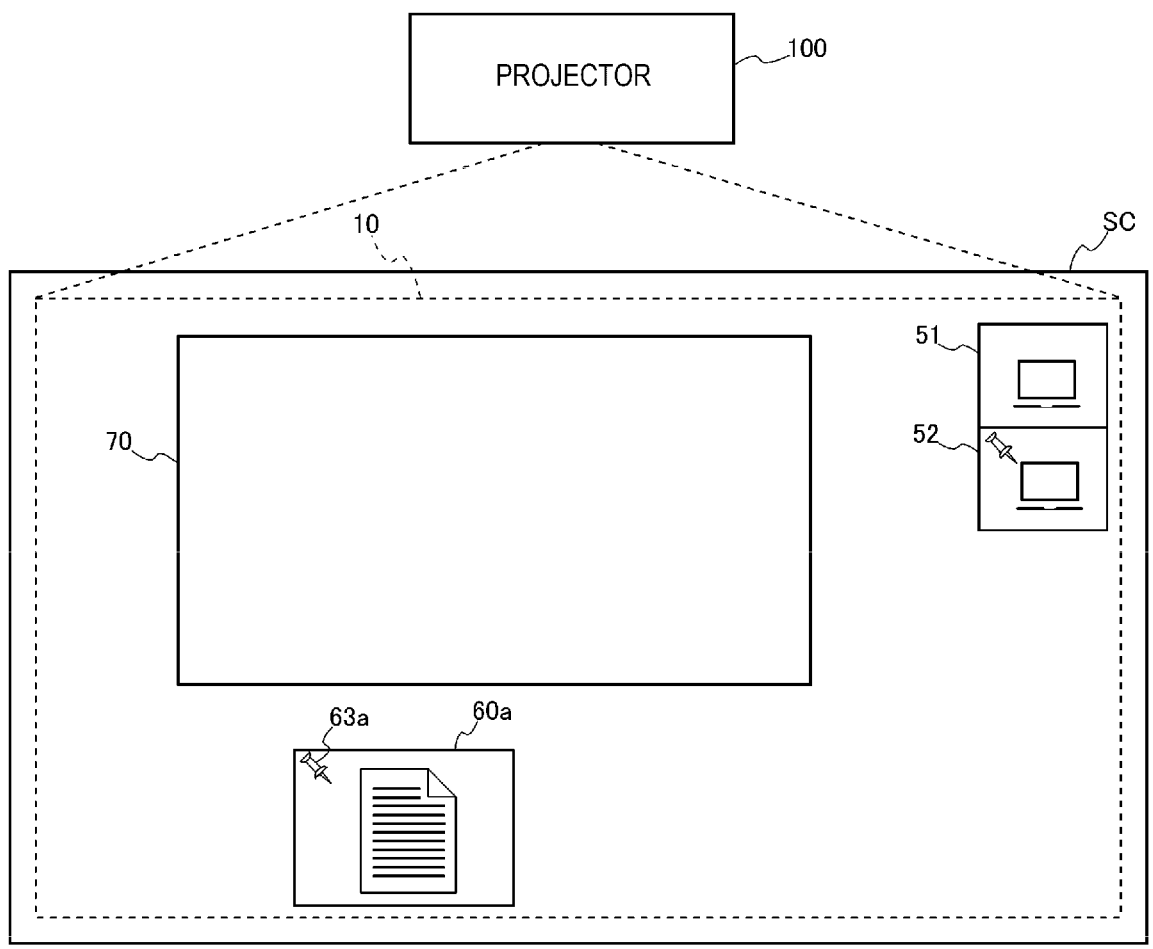
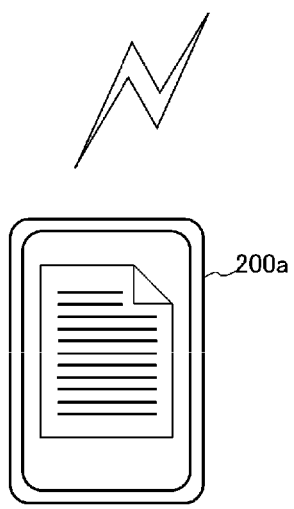

FIG. 16
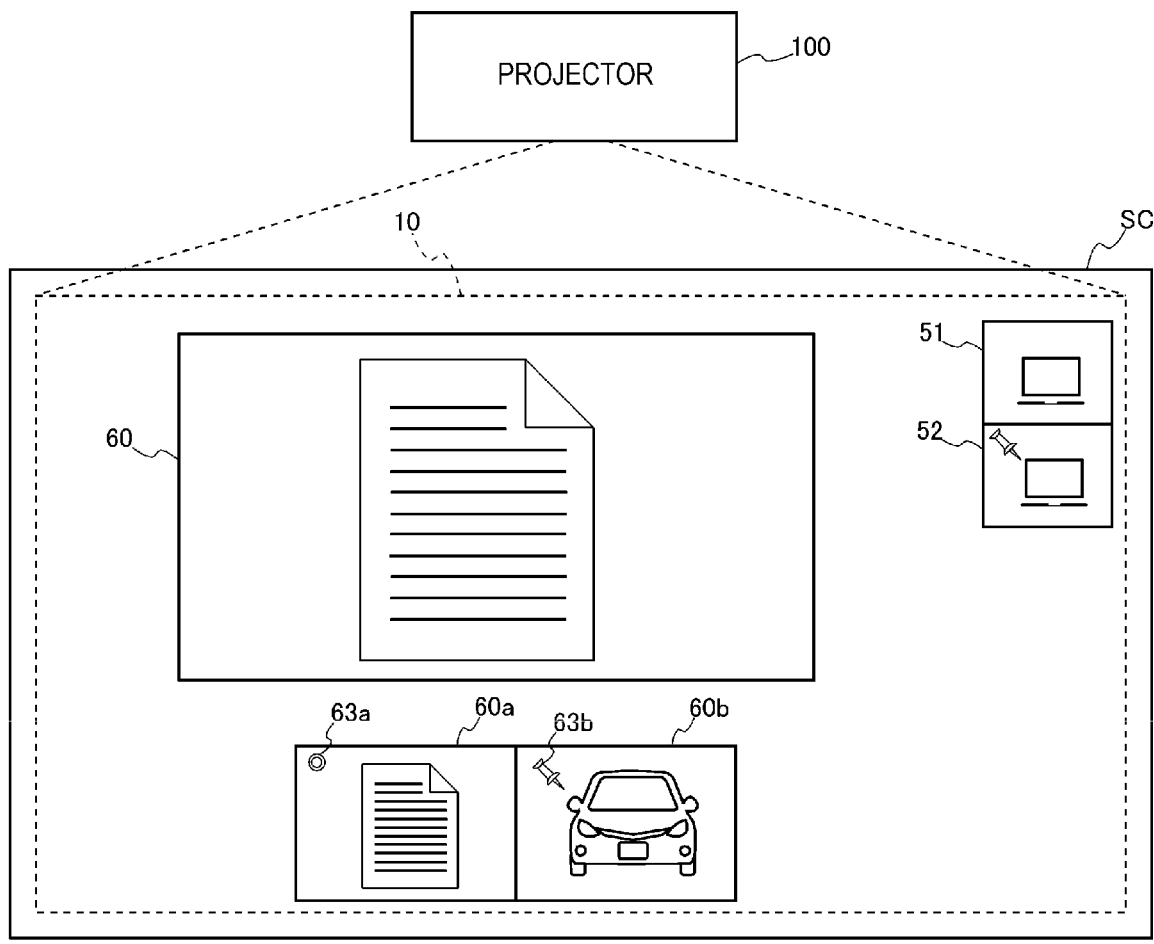
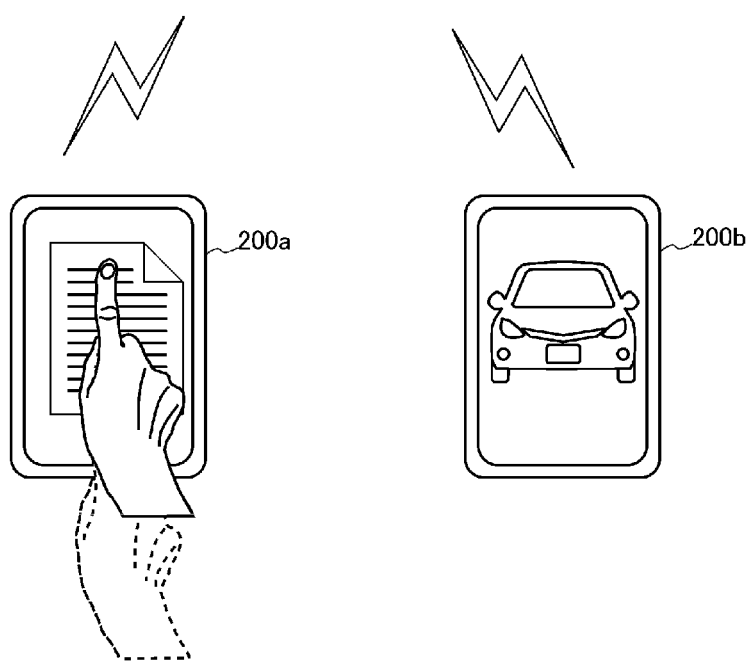

METHOD FOR CONTROLLING DISPLAY DEVICE, AND DISPLAY DEVICE

The present application is based on, and claims priority from JP Application Serial Number 2019-057883, filed Mar. 26, 2019, the disclosure of which is hereby incorporated by reference herein in its entirety.

BACKGROUND

1. Technical Field

The present disclosure relates to a method for controlling a display device, and a display device.

2. Related Art

According to the related art, a display device coupled to a plurality of external devices and displaying, on a display surface, an image based on an image signal inputted from these external devices, is known.

For example, JP-A-2017-224985 discloses an electronic blackboard which accepts a selection of an area within a display based on position information of a position pointed by a pointing unit, displays a first image inputted from an external device, outside the area, and displays a second image inputted from another external device, inside the area.

However, in order for the display device to continue displaying an image on a display surface, the external device must continue displaying an image, too. Therefore, the external device cannot execute other processing while the display device is displaying an image. To cope with this, an image displayed on the display surface is stored in the display device, and the display device displays the stored image on the display surface. In such a case, when a plurality of images are displayed on the display surface, it is desired to switch between selecting and not selecting an image to be stored in the display device, by as simple an operation as possible.

SUMMARY

An aspect of the present disclosure is directed to a method for controlling a display device including: displaying an image based on a first image signal that is inputted, in a first screen on a display surface along with a first icon; displaying an image based on a second image signal that is inputted, in a second screen on the display surface along with a second icon; detecting a selection operation to select the first icon or the second icon; storing the image based on the first image signal into a storage unit when the first icon is selected by the selection operation, and storing the image based on the second image signal into the storage unit when the second icon is selected by the selection operation; and displaying the image stored in the storage unit onto the display surface.

In the method for controlling a display device, a designation of a position and a size of a display area where the image stored in the storage unit is displayed may be accepted. The display area may be set based on the designation that is accepted, and the image stored in the storage unit may be displayed in the display area that is set.

In the method for controlling a display device, a display form of the first icon or the second icon selected by the selection operation may be changed from a first display form that is a display form before the first icon or the second icon is selected by the selection operation, to a second display form that is different from the first display form.

In the method for controlling a display device, when an operation to delete the image displayed in the display area is detected, the first icon or the second icon changed to the second display form may be changed to the first display form.

In the method for controlling a display device, it may be determined that the first icon is selected, when an instruction signal giving an instruction to display an image is inputted from an external device supplying the first image signal to the display device, and it may be determined that the second icon is selected, when an instruction signal giving an instruction to display an image is inputted from an external device supplying the second image signal to the display device.

In the method for controlling a display device, an image of the display surface may be picked up to generate picked-up image data by an image pickup unit provided in the display device. The selection operation may be detected, based on a pointed position pointed by a pointing unit on the display surface specified based on the picked-up image data that is generated, and a display position of the first icon and the second icon on the display surface.

Another aspect of the present disclosure is directed to a display device displaying an image on a display surface, including: an input unit to which an image signal is inputted; a control unit displaying, when a plurality of image signals are inputted to the input unit, a plurality of images corresponding respectively to the plurality of image signals that are inputted, in a plurality of screens on the display surface along with an icon; a detection unit detecting an operation to select one of the icons displayed respectively in the plurality of screens; and a storage unit. When the operation to select the icon is detected, the control unit stores the image displayed in the screen where the icon selected by the operation is displayed, into the storage unit. The control unit displays the image stored in the storage unit, onto the display surface.

BRIEF DESCRIPTION OF THE DRAWINGS

FIG. 15 shows a display image displayed on the screen in the third embodiment.

FIG. 16 shows a display image displayed on the screen in the third embodiment.

DESCRIPTION OF EXEMPLARY EMBODIMENTS

First Embodiment

An embodiment will now be described with reference to the accompanying drawings.

Figure 1:
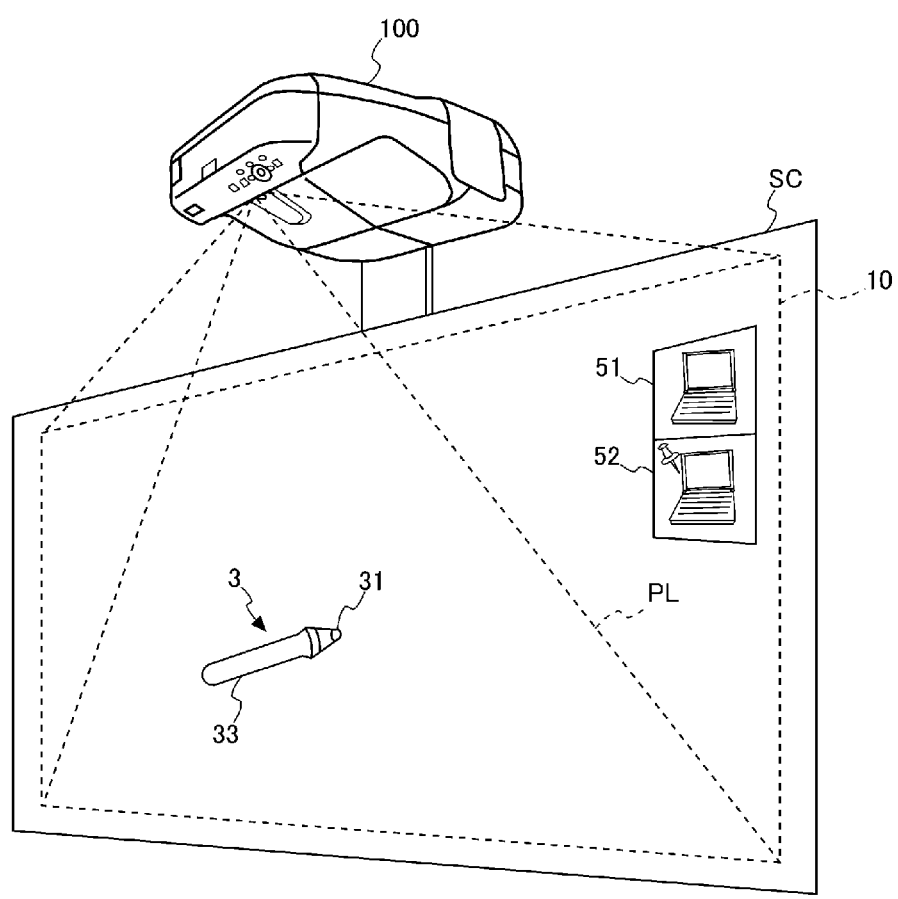
FIG. 1 is a perspective view of a projector and a screen.

FIG. 1 shows the configuration of a system in this embodiment. This embodiment has a pointing unit 3 as an operation device, and a projector 100 as a display device displaying an image on a display surface.

The pointing unit 3 is a pen-type pointing unit which a user holds in a hand for use. The pointing unit 3 has a tip part 31 which can emit light, and a shaft part 33 which the user grips, or the like. At the tip part 31, a light source such as an LED (light-emitting diode) emitting near-infrared light is installed. The pointing unit 3 detects a touch on the tip part 31 and causes the light source to emit light at a predetermined light emission interval.

In this embodiment, the case where the pointing unit 3 is a pen-type pointing unit is described. However, for example, a user's finger can be used as the pointing unit 3.

The projector 100 is a so-called short throw projector and is fixed to a wall surface above a screen SC, which is a display surface. The method for installing the projector 100 is not limited to the on-wall installation shown in FIG. 1 and may also be horizontal installation in which the projector 100 is placed horizontally on a desk, table, or floor, or ceiling-suspension-type installation in which the projector 100 is suspended from a ceiling. The screen SC, as the display surface, is a flat plate or curtain fixed to the wall or standing up on the floor. However, the display surface is not limited to the screen SC. For example, the wall itself can be used as a screen.

The projector 100 generates image light PL as an optical image and projects the generated image light PL onto the screen SC. An image based on the image light PL is formed on the screen SC. A range on the screen SC where the projector 100 can project the image light PL is referred to as a projection area 10.

Figure 2:
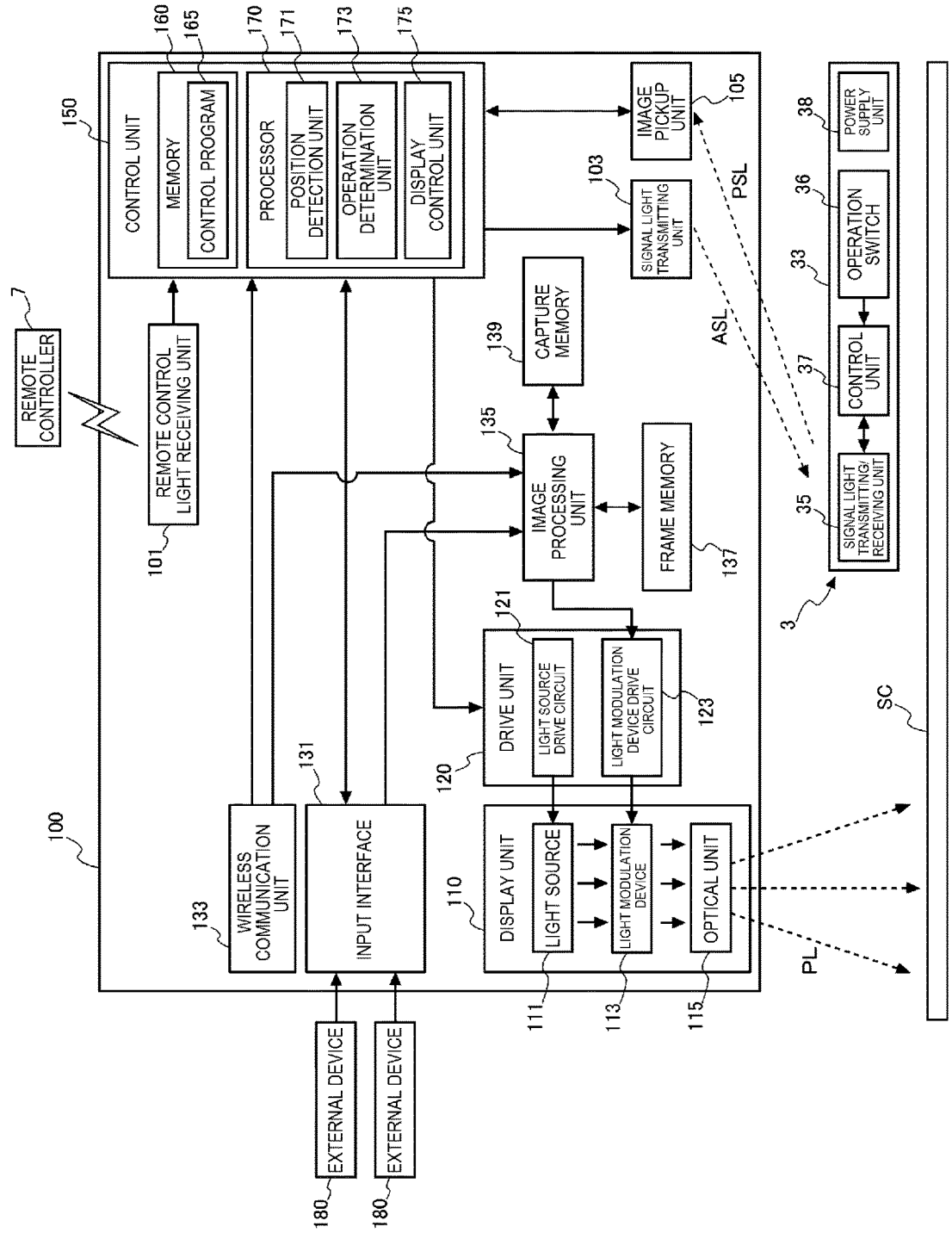
FIG. 2 is a block diagram showing the configuration of the projector.

The projector 100 also has an image pickup unit 105, as shown in FIG. 2. The image pickup unit 105 picks up an image over a range including the screen SC from obliquely above, thus picks up an image over a range including at least the screen SC, and generates picked-up image data. The image pickup unit 105 executes image pickup at the timing of light emission by the pointing unit 3. Thus, the picked-up image data includes an image of the light emitted by the pointing unit 3. The projector 100 analyzes the picked-up image data and detects a pointed position pointed by the pointing unit 3.

FIG. 2 is a block diagram showing the configuration of the pointing unit 3 and the projector 100.

First, the configuration of the pointing unit 3 will be described. The pointing unit 3 has a signal light transmitting/receiving unit 35, an operation switch 36, a control unit 37, and a power supply unit 38. These units are accommodated inside the shaft part 33.

The signal light transmitting/receiving unit 35 has a light source such as an infrared LED, and a light receiving element receiving device signal light ASL, which is an infrared signal transmitted from the projector 100. The signal light transmitting/receiving unit 35 turns on or off the light source under the control of the control unit 37 and causes the light source to emit light in a predetermined light emission pattern.

The operation switch 36 is built in the tip part 31 of the pointing unit 3 and turns on when pressed. The pointing unit 3 is operated in such a way that the tip part 31 comes into contact with the screen SC by the user holding the rod-like shaft part 33 in a hand. When the tip part 31 of the pointing unit 3 comes into contact with a wall or the screen SC, the operation switch 36 turns on.

The control unit 37 is coupled to the signal light transmitting/receiving unit 35 and the operation switch 36 and detects the turning on or off of the operation switch 36. The control unit 37 changes the timing of lighting and the lighting pattern of the light source of the signal light transmitting/receiving unit 35, between the case where the operation switch 36 is on and the case where the operation switch 36 is off. The projector 100 detects the position of the tip part 31, based on the light emission pattern of pointing unit signal light PSL, which is an infrared signal emitted from the pointing unit 3. The projector 100 also determines whether the operation switch 36 is on or not, that is, whether the pointing unit 3 is pressed against the wall or the screen SC or not, based on the lighting pattern of the pointing unit signal light PSL emitted from the pointing unit 3.

The power supply unit 38 has a dry cell battery or secondary battery as a power source and supplies electric power to each of the control unit 37, the signal light transmitting/receiving unit 35, and the operation switch 36. The pointing unit 3 is equipped with a power switch to turn on/off the power supply from the power supply unit 38.

The configuration of the projector 100 will now be described.

The projector 100 has, as its main components, an operation unit, an image projection system, an image processing system, and a control unit 150. The image projection system generates image light PL, which is an optical image, based on image data processed by the image processing system. The image projection system also projects the generated image light PL onto the screen SC. The image processing system electrically processes image data which an optical image is based on.

The projector 100 has a remote control light receiving unit 101, a signal light transmitting unit 103, and an image pickup unit 105, as an operation unit accepting an operation by the user. The signal light transmitting unit 103 and the image pickup unit 105, along with the control unit 150, operate as the "detection unit".

The remote control light receiving unit 101 receives an infrared signal transmitted from a remote controller 7. The remote control light receiving unit 101 outputs an operation signal corresponding to the received infrared signal to the control unit 150. The operation signal is a signal corresponding to a switch operated on the remote controller 7.

The signal light transmitting unit 103 outputs device signal light ASL, which is a signal to synchronize the timing of light emission by the pointing unit 3 with the timing of image pickup by the image pickup unit 105. The device signal light ASL is a near-infrared signal that can be received by the signal light transmitting/receiving unit 35 of the pointing unit 3. The signal light transmitting unit 103 periodically transmits the device signal light ASL during the operation of the projector 100.

The device signal light ASL is, for example, a control signal designating the timing for the pointing unit 3 to transmit the pointing unit signal light PSL. The pointing signal light PSL is near-infrared light having a predetermined light emission pattern. The pointing unit 3 transmits the pointing unit signal light PSL in a predetermined light emission pattern, for example, synchronously with the timing of receiving the device signal light ASL. This light emission pattern differs between the case where the operation switch 36 is on and the case where the operation switch 36 is off.

The image pickup unit 105 has an image pickup element such as a CMOS or CCD receiving the pointing unit signal light PSL emitted from the tip part 31 of the pointing unit 3, an optical system forming an image at the image pickup element, and a data processing circuit generating picked-up image data from the state where the pointing unit signal light PSL is received by the image pickup element, and the like.

The image pickup unit 105 picks up an image over a range including the screen SC at a predetermined time interval and generates picked-up image data, under the control of the control unit 150. The image pickup unit 105 outputs the generated picked-up image data to the control unit 150. The control unit 150 temporarily stores the picked-up image data inputted from the image pickup unit 105 into a memory 160, described later.

The image projection system has a display unit 110 and a drive unit 120 driving the display unit 110. The display unit 110 has a light source 111, a light modulation device 113, and an optical unit 115. The drive unit 120 has a light source drive circuit 121 and a light modulation device drive circuit 123.

As the light source 111, a lamp light source such as a halogen lamp, xenon lamp, or ultra-high-pressure mercury lamp is used. Also, a solid-state light source such as an LED (light-emitting diode) or laser light source may be used as the light source 111.

The light source 111 is coupled to the light source drive circuit 121. The light source drive circuit 121 is coupled to the light source 111 and the control unit 150. The light source drive circuit 121 supplies a drive current and a pulse to the light source 111 under the control of the control unit 150 and thus turns on and off the light source 111.

The light modulation device 113 has a light modulation element which modulates the light emitted from the light source 111 and generates image light PL. The light modulation device 113 emits the image light PL modulated by the light modulation element to the optical unit 115. As the light modulation element, for example, a transmission-type liquid crystal light valve, reflection-type liquid crystal light valve, digital mirror device or the like can be used.

The light modulation device 113 is coupled to the light modulation device drive circuit 123. The light modulation device drive circuit 123 is coupled to the control unit 150 and the light modulation device 113. The light modulation device drive circuit 123 drives the light modulation device 113 and draws an image, frame by frame, at the light modulation element, under the control of the control unit 150. For example, when the light modulation device 113 is formed of a liquid crystal light valve, the light modulation device drive circuit 123 is formed of a driver circuit driving the liquid crystal.

The optical unit 115 has an optical element such as a lens and a mirror, and projects the image light PL modulated by the light modulation device 113 toward the screen SC. Thus, an image based on the image light PL is formed on the screen SC.

The image processing system of the projector 100 will now be described.

The projector 100 has an input interface 131, a wireless communication unit 133, an image processing unit 135, a frame memory 137, and a capture memory 139, as the image processing system.

The input interface 131 is a coupling unit for coupling to an external device 180 and has a plurality of interfaces. The input interface 131 can be coupled to a plurality of external devices 180 via the plurality of interfaces. The input interface 131 is equivalent to an example of the "input unit".

The plurality of interfaces may be, for example, digital interfaces such as DVI (Digital Visual Interface), HDMI, DisplayPort, or HDBaseT. The plurality of interfaces may also be analog interfaces such as VGA (Video Graphics Array), D terminal, or S terminal. The plurality of interfaces may also be communication interfaces such as USB (Universal Serial Bus), Ethernet, or IEEE 1394. "HDMI", "HDBaseT", and "Ethernet" are registered trademarks.

Each of the plurality of interfaces has a connector for coupling a cable, and an interface circuit electrically processing an image signal received via the cable. The interface circuit receives an image signal and extracts image data and a synchronization signal included in the received image signal. The image data included in the image signal may be image data of a dynamic image or image data of a still image. The interface circuit outputs the extracted image data and synchronization signal to the image processing unit 135. The interface circuit also outputs the extracted synchronization signal to the control unit 150. The image processing unit 135 processes one frame of the image data synchronously with the inputted synchronization signal. The control unit 150 controls each part of the projector 100 synchronously with the inputted synchronization signal. One frame is a period during which an image for one screen is displayed. One frame of image data is image data displayed during a vertical scanning period prescribed by a vertical synchronization signal included in the synchronization signal.

The wireless communication unit 133 is a communication module including an antenna, an RF circuit, a baseband circuit, and the like. The wireless communication unit 133 executes, for example, wireless communication such as wireless LAN communication including Bluetooth or Wi-Fi, or NFC (near-field communication). Bluetooth and Wi-Fi are registered trademarks. The wireless communication unit 133 demodulates packet data from a radio wave received via the antenna, and extracts image data and a synchronization signal from the demodulated packet data. The wireless communication unit 133 outputs the extracted image data and synchronization signal to the image processing unit 135 and outputs the synchronization signal to the control unit 150.

The image processing unit 135 is coupled to the frame memory 137. The image processing unit 135 loads the inputted image data into the frame memory 137. The frame memory 137 has a plurality of banks. Each bank has a storage capacity to write image data of one frame. The frame memory 137 is formed of, for example, an SDRAM (synchronous dynamic random-access memory) or DDR SDRAM (double data rate synchronous dynamic random-access memory). For example, the frame memory 137 has a plurality of banks corresponding to the plurality of interfaces provided in the input interface 131 and to the wireless communication unit 133. The image processing unit 135 stores the image data inputted from the plurality of interfaces and the wireless communication unit 133 into one of the plurality of banks of the frame memory 137.

The image processing unit 135 is also coupled to the capture memory 139. The capture memory 139 is formed of an SDRAM, DDR SDRAM or the like, similarly to the frame memory 137. The image processing unit 135 stores the image data loaded in the frame memory 137 into the capture memory 139, as capture data, under the control of the control unit 150. The operation of storing the image data loaded in the frame memory 137 into the capture memory 139 is referred to as "capturing". An image displayed on the screen SC by the projector 100 based on capture data is referred to as a "capture image".

The image data loaded in the frame memory 137 is image data based on an image signal inputted from the external device 180 and is data displayed on the screen SC by the display unit 110. For example, when the projector 100 is synchronized with a 60-Hz vertical synchronization signal, the image data loaded in the frame memory 137 is rewritten every 16.7 milliseconds, which is the reciprocal of 60 Hz. Storing the image data loaded in the frame memory 137 into the capture memory 139, as capture data, enables the projector 100 to display the image data on its own even after the input of the image signal from the external device 180 is stopped. The capture memory 139 is equivalent to an example of the "storage unit".

The image processing unit 135 performs image processing on the image data loaded in the frame memory 137. The image processing performed by the image processing unit 135 includes, for example, resolution conversion or resizing, correction of distortion, shape correction, digital zoom processing, adjustment of the color tone and luminance of the image, and the like. The image processing unit 135 executes processing designated by the control unit 150 and performs processing using a parameter inputted from the control unit 150 according to need. The image processing unit 135 can also execute a combination of a plurality of kinds, of the foregoing image processing. The image processing unit 135 reads out image data loaded in a bank selected by the control unit 150, from the frame memory 137, and outputs the image data to the light modulation device drive circuit 123.

The image processing unit 135, the frame memory 137, and the capture memory 139 are formed of, for example, an integrated circuit. The integrated circuit includes an LSI, ASIC (application-specific integrated circuit), PLD (programmable logic device), FPGA (field-programmable gate array), SoC (system on chip) or the like. A part of the configuration of the integrated circuit may include an analog circuit. Also, a combination of the control unit 150 and an integrated circuit may be employed.

The configuration of the control unit 150 will now be described. The control unit 150 is a computer device having a memory 160 and a processor 170. The memory 160 has a volatile memory such as a RAM (random-access memory), and a non-volatile memory such as a ROM (read-only memory) or flash memory.

The memory 160 sores a control program 165 executed by the processor 170. The control program 165 includes an application program to capture an image based on an image signal inputted from the external device 180. Hereinafter this application program is referred to as an image capture app. Also, image data to display a sub screen display icon 51 and a pinned sub screen display icon 52, described later, onto the screen SC, is stored in the memory 160.

Also, calibration data is stored in the memory 160. The calibration data is data establishing a correspondence between the picked-up image data from the image pickup unit 105 and the projection area 10 on the screen SC. More specifically, the calibration data is data establishing a correspondence between coordinates set in the picked-up image data and coordinates set in the frame memory 137.

The control unit 150 analyzes the picked-up image data and detects a pointed position pointed by the pointing unit 3. The pointed position detected here is a position in the picked-up image data. The control unit 150 converts a coordinate value representing the detected pointed position in the picked-up image data into a coordinate value in the frame memory 137, based on the calibration data. As the pointed position in the picked-up image data is converted into the corresponding position in the frame memory 137, for example, when an icon is displayed on the screen SC, whether the icon is selected by the pointing unit 3 or not can be determined. The calibration data is generated as follows. For example, a pattern image where a plurality of patterns are formed is displayed on the screen SC. This pattern image is picked up by the image pickup unit 105. Then, a correspondence is established between the positions of the plurality of patterns in the picked-up image data picked up by the image pickup unit 105 and the position of the pattern image loaded in the frame memory 137.

The processor 170 is an arithmetic processing device formed of a CPU (central processing unit) or microcomputer. The processor 170 executes the control program 165 and thus controls each part of the projector 100. The processor 170 may be formed of a single processor or can be formed of a plurality of processors. The processor 170 may also be formed of an SoC (system on chip) integrated with apart or the entirety of the memory 160 or another circuit. The processor 170 may also be formed of a combination of a CPU executing a program and a DSP (digital signal processor) executing predetermined arithmetic processing. Moreover, all the functions of the processor 170 may be implemented by hardware or using a programmable device.

The processor 170 has, as its functional blocks, a position detection unit 171, an operation determination unit 173, and a display control unit 175. For the sake of convenience, these functional blocks represent functions implemented by the processor 170 executing a command set described in the control program 165 and thus performing data computation and control. The functional blocks do not represent any particular application program or hardware.

The position detection unit 171 causes the signal light transmitting unit 103 to transmit device signal light ASL at a predetermined interval. The position detection unit 171 also causes the control unit 150 to execute image pickup synchronously with the timing of transmission of the device signal light ASL. The image pickup unit 105 picks up an image over a range including the screen SC, generates picked-up image data, and outputs the generated picked-up image data to the control unit 150. The picked-up image data is temporarily stored in the memory 160.

The position detection unit 171 acquires the picked-up image data from the memory 160, analyzes the acquired picked-up image data, and detects pointing unit signal light PSL. The position detection unit 171 converts a coordinate value representing the position of the detected pointing unit signal light PSL into a coordinate value in the frame memory 137, based on the calibration data. The position detection unit 171 also specifies the light emission pattern of the pointing unit signal light PSL, based on the timing of image pickup of the picked-up image data where the pointing unit signal light PSL is detected, and determines whether the pointing unit 3 is in contact with the screen SC or not.

The operation determination unit 173 determines the operation carried out by the pointing unit 3, based on the coordinate value in the frame memory 137 converted by the position detection unit 171. For example, when the coordinate value in the frame memory 137 where the pointing unit signal light PSL is detected represents a position where image data of an icon, button or the like displayed on the screen SC is loaded, the operation determination unit 173 determines that this icon is selected.

When pointing unit signal light PSL is continuously detected from a plurality of picked-up image data that are continuously picked up, the operation determination unit 173 finds a trajectory of the coordinate value in the frame memory 137 of the plurality of pointing unit signal lights PSL that are detected. The operation determination unit 173 specifies the operation carried out by the pointing unit 3, based on the trajectory of the coordinate value that is found. For example, the operation determination unit 173 sets a display area 70, described later, based on the trajectory that is found.

The display control unit 175 selects image data to be displayed on the screen SC and causes the image processing unit 135 to execute image processing of the selected image data. The display control unit 175 also controls the drive unit 120 and thus causes the display unit 110 to generate image light PL and to project the generated image light PL onto the screen SC.

Figure 3:
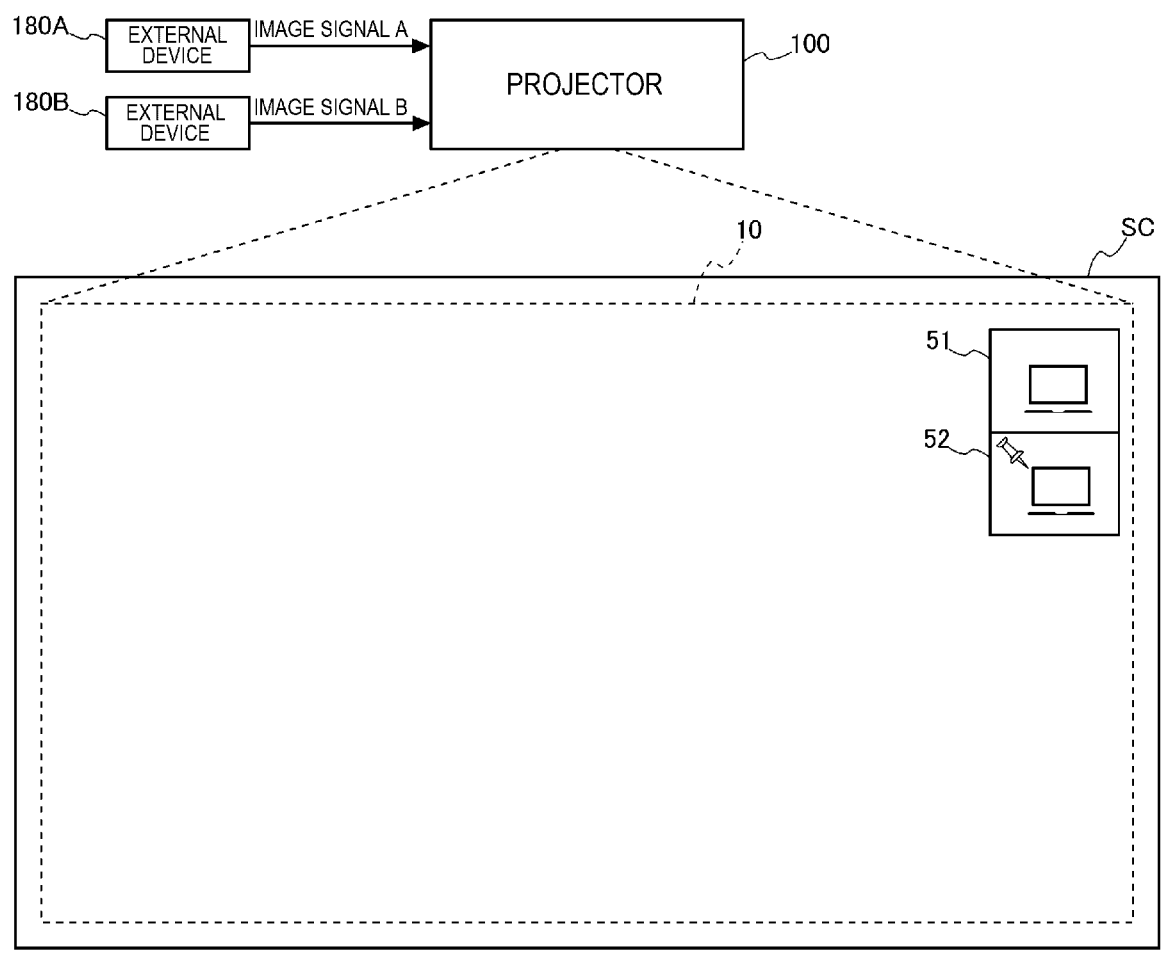
FIG. 3 shows a display image displayed on the screen in a first embodiment.
Figure 4:
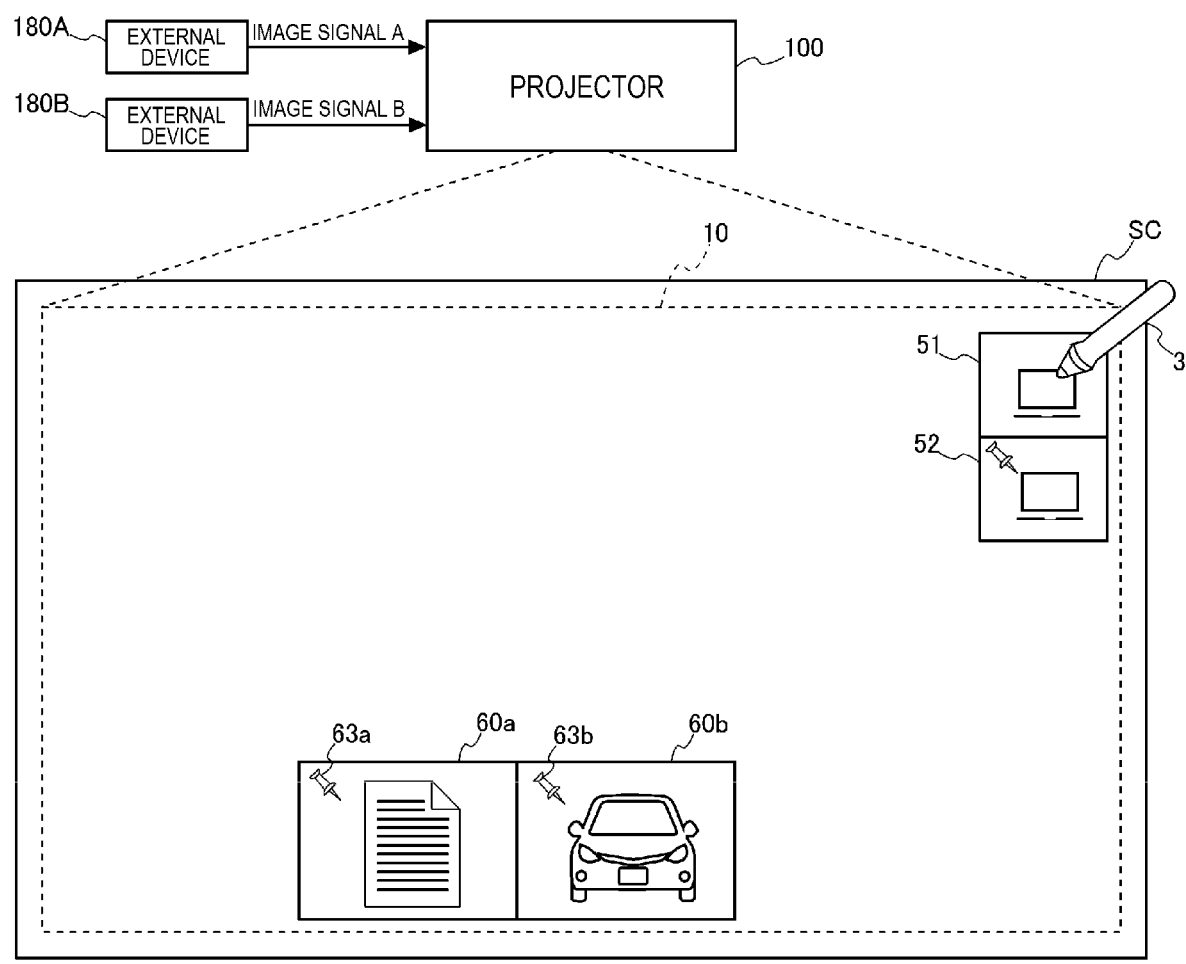
FIG. 4 shows a display image displayed on the screen in the first embodiment.

FIGS. 3 and 4 show a display image displayed on the screen SC by the projector 100. Particularly, FIG. 3 shows an initial screen displayed on the screen SC when the image capture app is selected. FIG. 4 shows an image displayed on the screen SC when a sub screen display icon 51 is selected.

In the description below, the case where, as the external device 180, an external device 180A and an external device 180B are coupled to the projector 100 and where the external device 180A supplies an image signal A and the external device 180B supplies an image signal B, is described. The image signal A is equivalent to the "first image signal" according to the present disclosure. The image signal B is equivalent to the "second image signal" according to the present disclosure.

For example, when the user operates the remote controller 7 to select the image capture app, the processor 170 executes the selected image capture app and displays the initial screen shown in FIG. 3 on the screen SC. In this initial screen, a sub screen display icon 51 and a pinned sub screen display icon 52 are displayed.

The sub screen display icon 51 is an icon to display, in a sub screen 60, an image based on an image signal inputted to the input interface 131. The image data included in the image signal inputted to the input interface 131 is hereinafter referred to as an "input image". The control unit 150 determines whether the pointed position pointed by the pointing unit 3 is located within the display range of the sub screen display icon 51 or not, and thus determines whether the sub screen display icon 51 is selected or not. When the sub screen display icon 51 is selected, the control unit 150 causes the image processing unit 135 to generate a thumbnail image of the input image. The image processing unit 135 generates a thumbnail image by reducing the size of the image data of input image loaded in the frame memory 137. The image processing unit 135 loads an image frame representing the sub screen 60 into a predetermined area in the frame memory 137 and loads the generated thumbnail image into the loaded image frame. Thus, the sub screen 60 and the thumbnail image displayed within the sub screen 60 are displayed on the screen SC.

FIG. 4 shows the state where input images inputted from the external devices 180A, 180B are displayed as thumbnail images. For example, it is assumed that the thumbnail image of the input image inputted from the external device 180A is displayed in a sub screen 60a and that the thumbnail image of the input image inputted from the external device 180B is displayed in a sub screen 60b. Although FIG. 4 shows the two sub screens 60, that is, the sub screen 60a and the sub screen 60b, the number of sub screens 60 displayed in the projection area 10 is changed according to the number of image signals inputted to the input interface 131. The sub screen 60a is equivalent to an example of the "first screen" according to the present disclosure. The sub screen 60b is equivalent to an example of the "second screen" according to the present disclosure.

In each sub screen 60, a pin icon 63 is displayed. The pin icon 63 is an icon which causes the projector 100 capture image data of an input image.

The pin icon 63 displayed in the sub screen 60a is shown as a pin icon 63a. The pin icon 63 displayed in the sub screen 60b is shown as a pin icon 63b. For example, when the pin icon 63a is selected by the pointing unit 3, the image data of the image signal A, which is the basis of the thumbnail image displayed in the sub screen 60a, is read out from the frame memory 137 and stored into the capture memory 139. The pin icon 63a is equivalent to an example of the "first icon" according to the present disclosure. The pin icon 63b is equivalent to an example of the "second icon" according to the present disclosure.

The display form of the pin icon 63 includes a first display form and a second display form. The first display form represents the pinned state with the pin icon 63. The second display form represents the unpinned state with the pin icon 63. Selecting the pin icon 63 in the unpinned state by the pointing unit 3 changes the display form of the pin icon 63 from the unpinned state to the pinned state. Meanwhile, selecting the pin icon 63 in the pinned state by the pointing unit 3 changes the display form of the pin icon 63 from the pinned state to the unpinned state.

The pinned sub screen display icon 52, too, is an icon to display, in the sub screen 60, an input image inputted to the input interface 131. However, when the pinned sub screen display icon 52 is selected, a thumbnail image of capture data captured in the capture memory 139 is displayed in the sub screen 60. When the pinned sub screen display icon 52 is selected, the image data of the input image is stored into the capture memory 139 at a preset timing, so as to generate capture data. The present timing may be, for example, the timing when the pinned sub screen display icon 52 is selected, or the timing when the display area 70, described later, is set.

Figure 5:
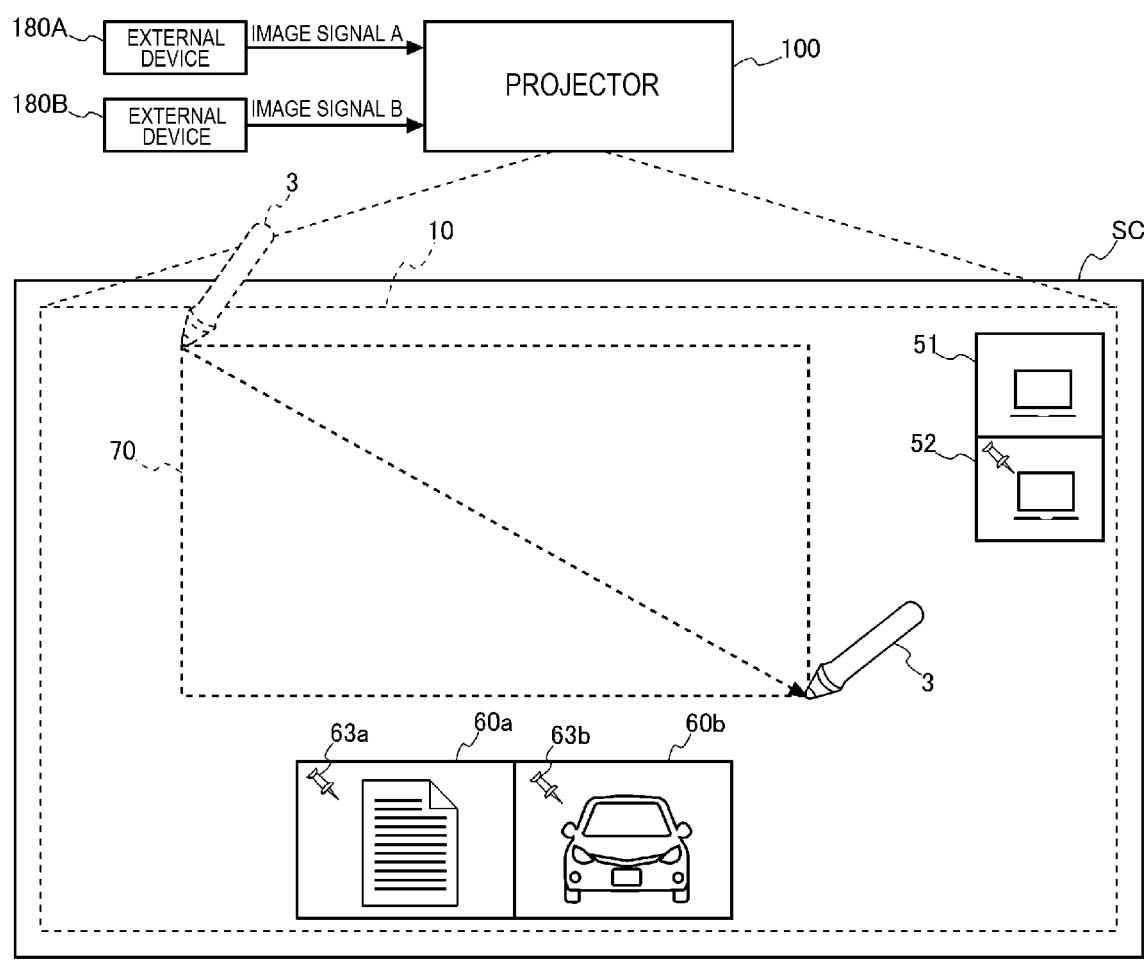
FIG. 5 shows a display image displayed on the screen in the first embodiment.
Figure 6:
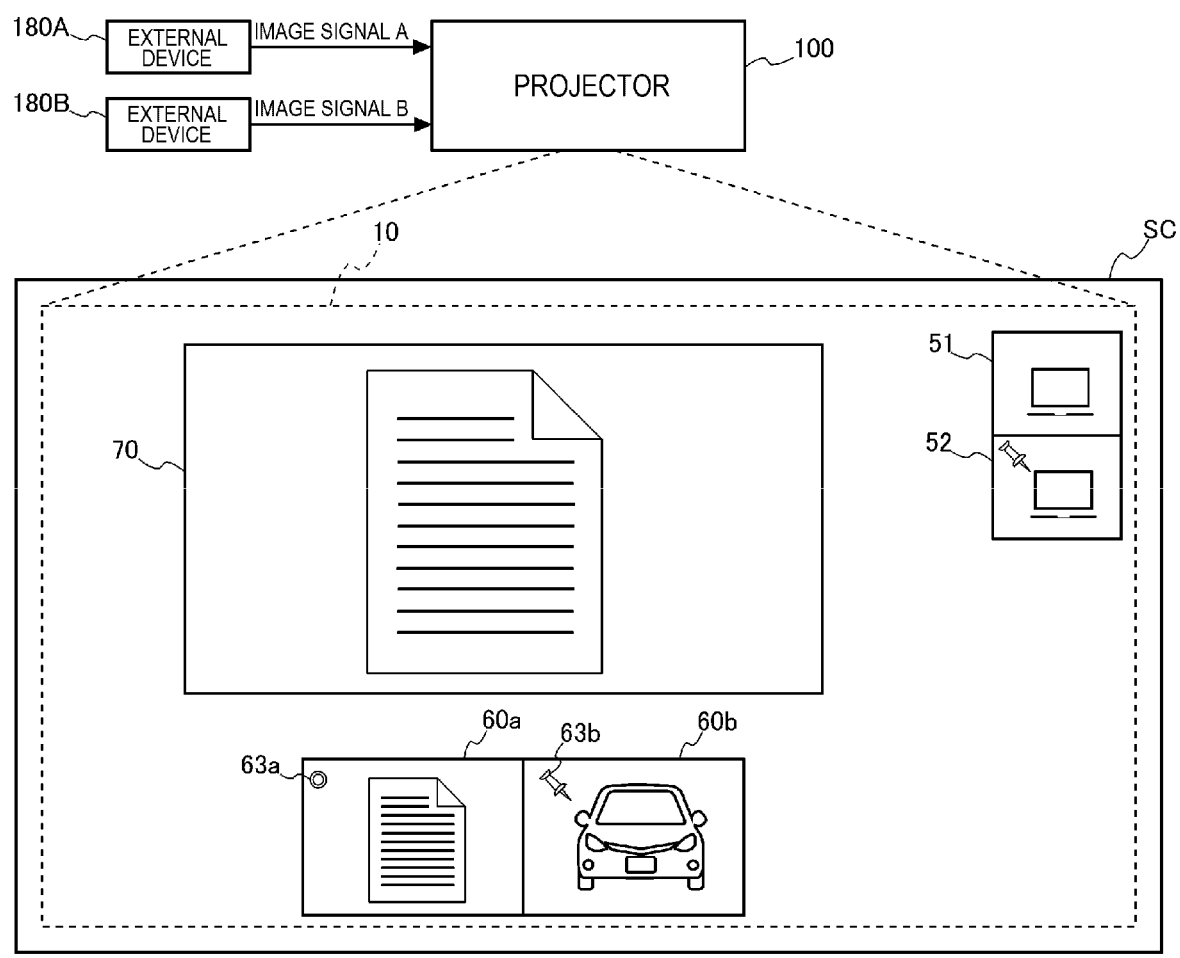
FIG. 6 shows a display image displayed on the screen in the first embodiment.

FIGS. 5 and 6 show a display image displayed on the screen SC by the projector 100. Particularly, FIG. 5 explains a method for setting a display area 70 by the pointing unit 3. FIG. 6 shows an image displayed on the screen SC when the pin icon 63a is selected.

The processing after the sub screen display icon 51 is selected and a thumbnail image is displayed in the sub screen 60a and the sub screen 60b will be described with reference to FIGS. 5 and 6.

When a thumbnail image is displayed in the sub screen 60a and the sub screen 60b, the user then sets a display area 70. Using the pointing unit 3, the user designates the display area 70, which is a range in the projection area 10 where the input image is to be displayed. The user brings the tip part 31 of the pointing unit 3 into contact with the screen SC and moves the tip part 31 on the screen SC, with the tip part 31 kept in contact with the screen SC. At this time, the user moves the pointing unit 3 in such a way that the trajectory of the pointing unit 3 that is moved coincides with a diagonal line of the display area 70. The control unit 150 detects the pointed position from each of picked-up image data continuously picked up at a predetermined interval and finds a trajectory of the detected pointed position. The control unit 150 sets a rectangular area having a diagonal line that coincides with the trajectory of the detected pointed position, as the display area 70.

In this embodiment, the case where the pointing unit 3 is moved in such a way that the trajectory of the pointing unit 3 coincides with a diagonal line of the display area 70 is described. However, the method for setting the display area 70 is not limited to this method. For example, a rectangular display area 70 having a preset size and shape may be displayed on the screen SC, and the user may change the size and shape of the display area 70 by operating the pointing unit 3. The user brings the pointing unit 3 into contact with the screen SC at a position where a vertex of the display area 70 is displayed, and moves the pointing unit 3, which is kept in contact with the screen SC. The control unit 150 changes the size and shape of the display area 70 in such a way that the pointed position pointed by the moving pointing unit 3 coincides with a vertex of the display area 70.

Also, the pointing unit 3 may be moved in contact with the screen SC and thus draw an outer circumference of the display area 70.

On completion of the setting of the display area 70, the user selects an image to be displayed in the set display area 70, with reference to the thumbnail images displayed in the sub screen 60a and the sub screen 60b. At this time, when the image to be displayed in display area 70 is not displayed in the sub screen 60a or the sub screen 60b, the user operates the external device 180 to display a thumbnail image of the image to be displayed, in the sub screen 60a or the sub screen 60b. For example, when the input image is image data of a dynamic image, when the playback position of the image data of the dynamic image in the external device 180 is changed, the thumbnail image displayed in the sub screen 60a or the sub screen 60b is changed. When the thumbnail image of the image to be displayed is displayed in the sub screen 60a or the sub screen 60b, the user selects a pin icon 63 by the pointing unit 3.

The control unit 150 determines whether the pointed position pointed by the pointing unit 3 is a position corresponding to the display position of the pin icon 63 or not, and thus detects a selection operation to select the pin icon 63. When the pin icon 63 is selected, the control unit 150 specifies the sub screen 60 where the selected pin icon 63 is displayed. The control unit 150 stores image data which is the basis of the thumbnail image displayed in the specified sub screen 60, into the capture memory 139, so as to generate capture data. The control unit 150 also loads the capture data into an area in the frame memory 137 corresponding to the display area 70 and displays a capture image in the display area 70 on the screen SC. FIG. 6 shows the state where the pin icon 63a is selected and where image data which is the basis of the thumbnail image displayed in the sub screen 60a is captured and displayed as a capture image in the display area 70. As the pin icon 63a is selected, the display form of the pin icon 63a is changed from the unpinned state to the pinned state.

Figure 7:
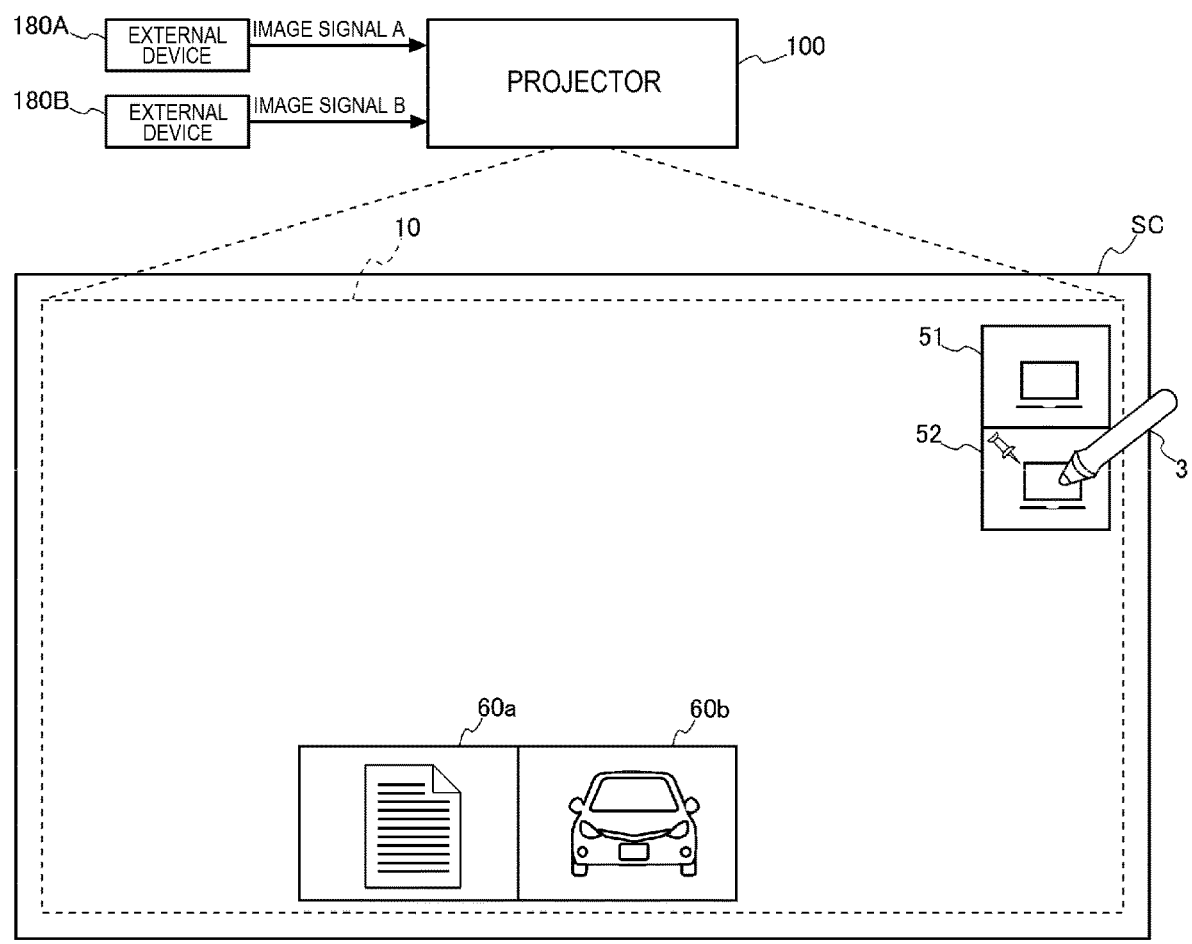
FIG. 7 shows a display image displayed on the screen in the first embodiment.

FIG. 7 shows a display image displayed on the screen SC by the projector 100. Particularly, FIG. 7 shows an image displayed on the screen SC when the pinned sub screen display icon 52 is selected.

The control unit 150 determines whether the pointed position pointed by the pointing unit 3 is within the display range of the pinned sub screen display icon 52 or not, and thus determines whether the pinned sub screen display icon 52 is selected or not. When the pinned sub screen display icon 52 is selected, the control unit 150 causes the image processing unit 135 to store image data of an input image into the capture memory 139 and to generate capture data. The control unit 150 also causes the image processing unit 135 to generate a thumbnail image of the capture data and to display the generated thumbnail image in the sub screen 60.

The case where the pinned sub screen display icon 52 is selected is described, again on the assumption that the external device 180A and the external device 180B are coupled to the input interface 131 and that the input image A and the input image B are inputted from the external device 180A and the external device 180B. In the sub screen 60a shown in FIG. 7, a thumbnail image of capture data obtained by capturing an image based on the image signal A inputted from the external device 180A is displayed. In the sub screen 60b, a thumbnail image of capture data obtained by capturing an image based on the image signal B inputted from the external device 180B is displayed.

Figure 8:
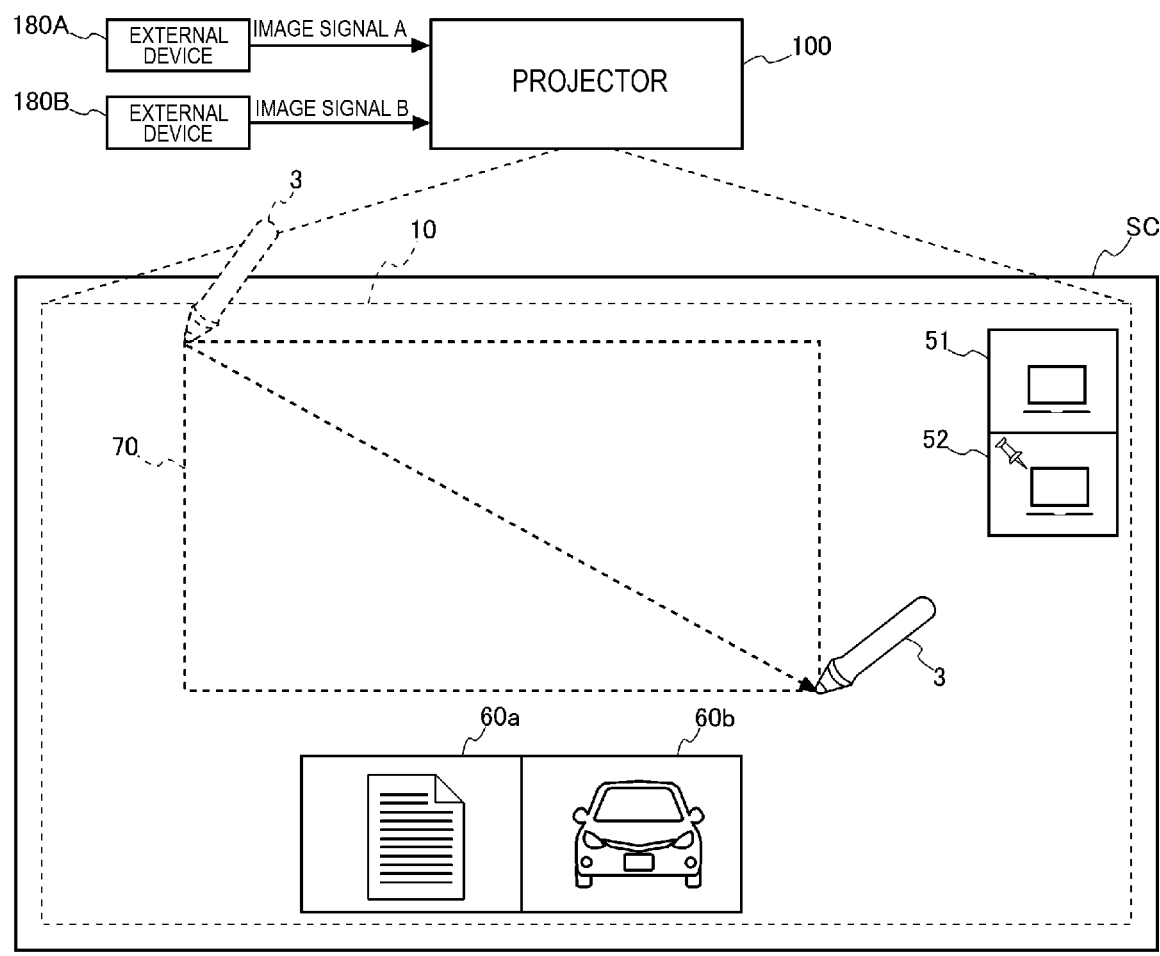
FIG. 8 shows a display image displayed on the screen in the first embodiment.

FIG. 8 shows a display image displayed on the screen SC by the projector 100. Particularly, FIG. 8 shows a method for setting the display area 70.

After selecting the pinned sub screen display icon 52, the user sets the display area 70, as in the case where the sub screen display icon 51 is selected. The method for setting the display area 70 is to move the pointing unit 3 in such a way that the trajectory of the movement of the pointing unit 3 coincides with a diagonal line of the display area 70, as described above with reference to FIG. 5. The control unit 150 detects the trajectory of the movement of the pointing unit 3 and sets an area having a diagonal line that coincides with the detected trajectory of the movement, as the display area 70.

Figure 9:
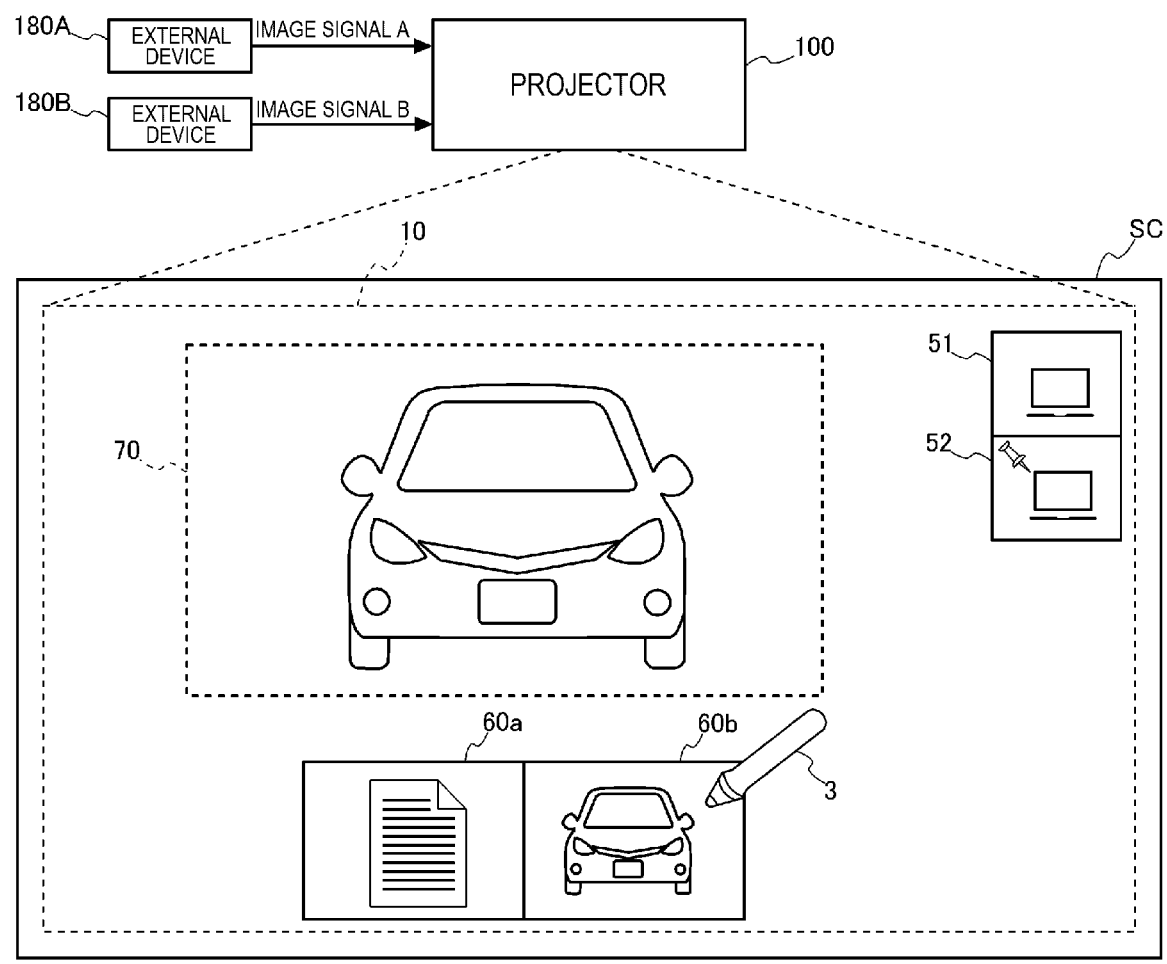
FIG. 9 shows a display image displayed on the screen in the first embodiment.

FIG. 9 shows a display image displayed on the screen SC by the projector 100. Particularly, FIG. 9 shows a method for selecting the sub screen 60 by the pointing unit 3.

On completion of the setting of the display area 70, the user views the thumbnail images displayed in the sub screen 60a and the sub screen 60b and selects an image to be displayed in the display area 70, by the pointing unit 3. The user brings the pointing unit 3 into contact with the inside of the sub screen 60 where the selected thumbnail image is displayed. The control unit 150 determines whether the pointed position pointed by the pointing unit 3 indicates a range corresponding to the display range of the sub screen 60 or not, and thus determines whether the sub screen 60 is selected or not. When the sub screen 60 is selected, the control unit 150 loads capture data which is the basis of the thumbnail image displayed in the selected sub screen 60, into an area corresponding to the display area 70 in the frame memory 137, and displays a capture image in the display area 70 on the screen SC. FIG. 9 shows the state where a capture image of capture data which is the basis of the thumbnail image displayed in the sub screen 60b is displayed in the display area 70.

Figure 10:
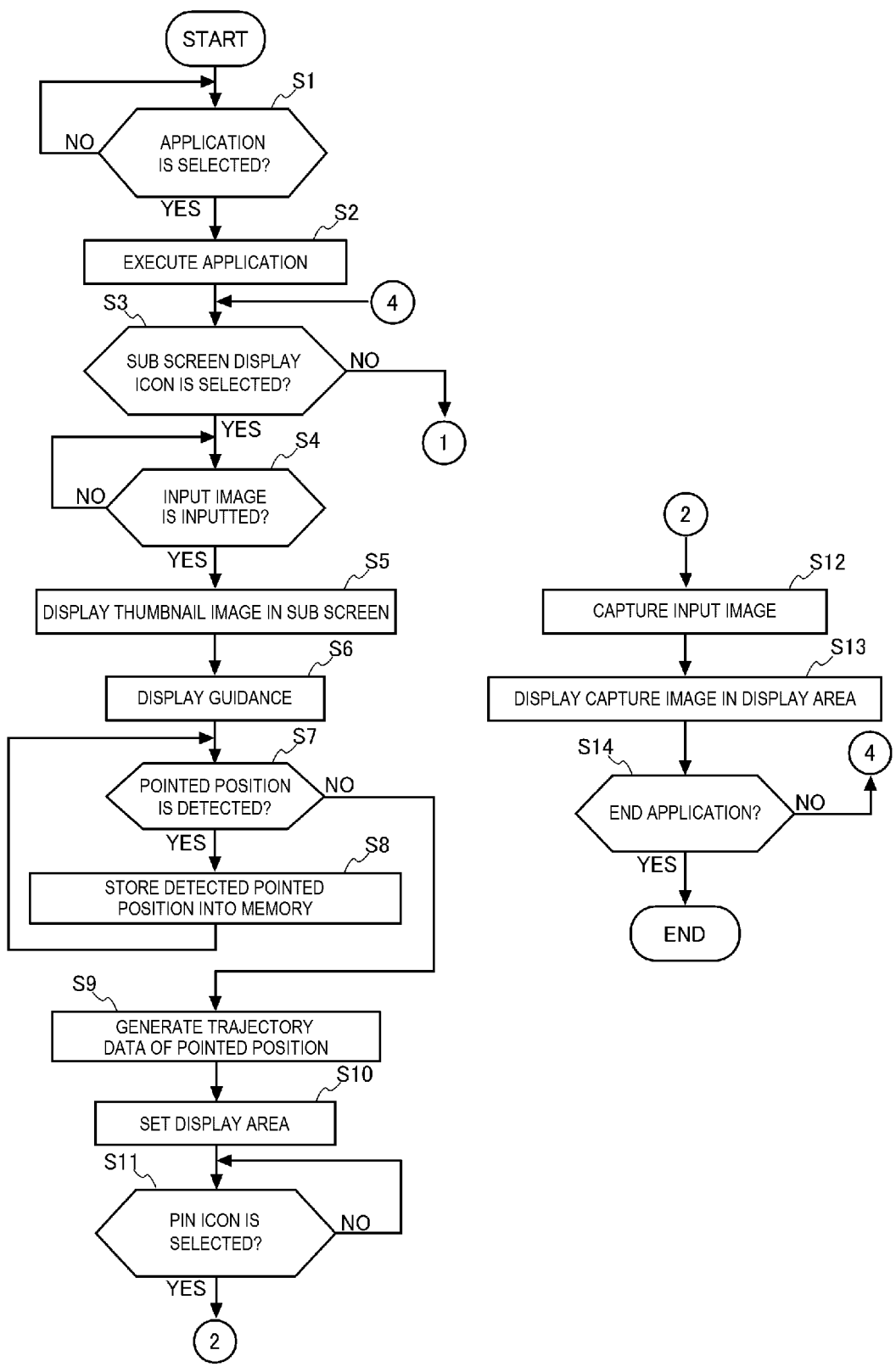
FIG. 10 is a flowchart showing operations of the projector in the first embodiment.
Figure 11:
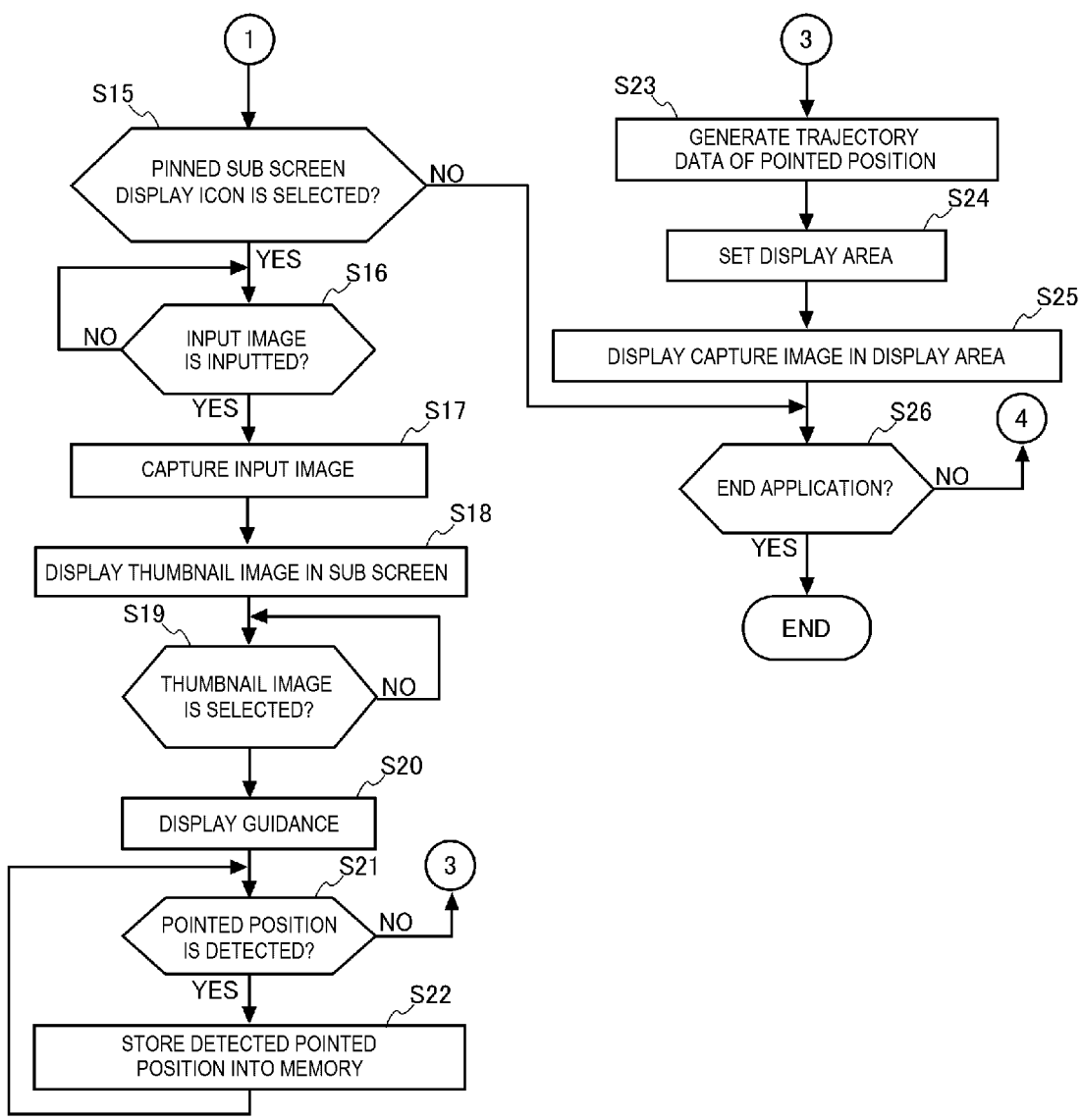
FIG. 11 is a flowchart showing operations of the projector in the first embodiment.

FIGS. 10 and 11 are flowcharts showing operations of the projector 100.

The operations of the projector 100 will now be described with reference to FIGS. 10 and 11.

First, the control unit 150 determines whether an application is selected by operating the remote controller 7 or the pointing unit 3, or not (step S1). In this flowchart, the case of determining whether the image capture app is selected as an application program or not is described. When an operation to select the image capture app is not accepted (NO in step S1), the control unit 150 waits to start processing until the image capture app is selected.

When an operation to select the image capture app is accepted (YES in step S1), the control unit 150 executes the image capture app (step S2) and start processing. On starting processing, the control unit 150 displays the sub screen display icon 51 and the pinned sub screen display icon 52 on the screen SC. The control unit 150 also analyzes picked-up image data from the image pickup unit 105 and determines whether the sub screen display icon 51 or the pinned sub screen display icon 52 is selected by the pointing unit 3 or not (step S3).

When the sub screen display icon 51 is selected by the pointing unit 3 (YES in step S3), the control unit 150 determines whether an input image is inputted to the input interface 131 or not (step S4). When an input image is not inputted to the input interface 131 (NO in step S4), the control unit 150 displays, for example, information that an image signal is not inputted, on the screen SC, and waits until an input image is inputted to the input interface 131. Meanwhile, when an input image is inputted to the input interface 131 (YES in step S4), the control unit 150 reduces the input image in size to generate a thumbnail image. The control unit 150 then displays the generated thumbnail image in the sub screen 60 (step S5). When a plurality of external devices 180 are coupled to the input interface 131 and input images are inputted from the plurality of external devices 180, a plurality of sub screens 60 corresponding to the plurality of external devices 180 are displayed on the screen SC.

Next, the control unit 150 displays a guidance display to guide the method for setting the display area 70 (step S6). For example, the control unit 150 displays guidance on the screen SC, such as "The pointing unit 3 is to be detected to set a display area. Draw a diagonal line of the display area with the pointing unit 3 in contact with the screen SC."

Next, the control unit 150 causes the image pickup unit 105 to execute image pickup. The image pickup unit 105 performs image pickup at a preset interval and generates picked-up image data. The picked-up image data is outputted to the control unit 150 and temporarily stored into the memory 160 of the control unit 150.

The control unit 150 sequentially reads out the picked-up image data from the memory 160, analyzes the read-out picked-up image data, and detects a pointed position pointed by the pointing unit 3 in contact with the screen SC (step S7). On detecting the pointed position pointed by the pointing unit 3 in contact with the screen SC, the control unit 150 stores the detected pointed position into the memory 160 (step S8). The control unit 150 repeats this processing until a pointed position pointed by the pointing unit 3 in contact with the screen SC is no longer detected.

When a pointed position pointed by the pointing unit 3 in contact with the screen SC is no longer detected (NO in step S7), the control unit 150 connects together the coordinates of the pointed positions stored in the memory 160 and thus generates trajectory data (step S9). After generating the trajectory data, the control unit 150 sets a rectangular area having a diagonal line that coincides with the trajectory represented by the generated trajectory data, as the display area 70 (step S10).

Next, the control unit 150 determines whether the pin icon 63 is selected by the pointing unit 3 or not (step S11). When the pin icon 63 is not selected by the pointing unit 3 (NO in step S11), the control unit 150 returns to the determination in step S11.

When the pin icon 63 is selected by the pointing unit 3 (YES in step S11), the control unit 150 captures image data of an input image which is the basis of the thumbnail image displayed in the sub screen 60 corresponding to the selected pin icon 63 (step S12). The control unit 150 causes the image processing unit 135 to store the image data of the input image that is the basis of the thumbnail image into the capture memory 139 and to generate capture data (step S12). The control unit 150 also loads the generated capture data into an area corresponding to the display area 70 in the frame memory 137 and displays a capture image, which is an image based on the capture data, in the display area 70 on the screen SC (step S13).

Subsequently, the control unit 150 determines whether an operation to end the image capture app is accepted or not (step S14). When an operation to end the image capture app is not accepted (NO in step S14), the control unit 150 returns to the determination in step S3. Meanwhile, when an operation to end the image capture app is accepted (YES in step S14), the control unit 150 ends this processing flow.

The operations of the projector 100 in the case where the sub screen display icon 51 is not selected but the pinned sub screen display icon 52 is selected in step S3 will now be described with reference to the flowchart shown in FIG. 11. When the sub screen display icon 51 is not selected (NO in step S3), the control unit 150 determines whether the pinned sub screen display icon 52 is selected or not (step S15). When the pinned sub screen display icon 52 is not selected (NO in step S15), the control unit 150 shifts to the determination in step S26. The determination in step S26 will be described later.

When the pinned sub screen display icon 52 is selected (YES in step S15), the control unit 150 determines whether an input image is inputted to the input interface 131 or not (step S16). When an input image is not inputted to the input interface 131 (NO in step S16), the control unit 150 displays, for example, information that an image signal is not inputted, on the screen SC, and waits until an input image is inputted to the input interface 131. Meanwhile, when an input image is inputted to the input interface 131 (YES in step S16), the control unit 150 stores the image data of the inputted input image into the capture memory 139 (step S17), so as to generate capture data. The control unit 150 then reduces the generated capture data in size to generate a thumbnail image, and displays the generated thumbnail image in the sub screen 60 (step S18).

Subsequently, the control unit 150 displays a guidance display (step S20) and then analyzes picked-up image data and detects a pointed position pointed by the pointing unit 3 in contact with the screen SC (step S21), as in the case where the sub screen display icon 51 is selected. On detecting the pointed position pointed by the pointing unit 3 in contact with the screen SC, the control unit 150 stores the detected pointed position into the memory 160 (step S22). When a pointed position pointed by the pointing unit 3 in contact with the screen SC is no longer detected (NO in step S21), the control unit 150 connects together the coordinates of the pointed positions stored in the memory 160 and thus generates trajectory data (step S23). The control unit 150 then sets a rectangular area having a diagonal line that coincides with the trajectory represented by the generated trajectory data, as the display area 70 (step S24). Subsequently, the control unit 150 loads the capture data generated in step S17 into an area corresponding to the display area 70 in the frame memory 137 and displays a capture image in the display area 70 on the screen SC (step S25).

After displaying the capture image in the display area 70 on the screen SC, the control unit 150 determines whether an operation to end the image capture app is accepted or not (step S26). When an operation to end the image capture app is not accepted (NO in step S26), the control unit 150 returns to the determination in step S3. Meanwhile, when an operation to end the image capture app is accepted (YES in step S26), the control unit 150 ends this processing flow.

As described above, the projector 100 according to this embodiment displays the image based on the inputted image signal A, in the sub screen 60a on the screen SC along with the pin icon 63a. The projector 100 also displays the image based on the inputted image signal B, in the sub screen 60b on the screen SC along with the pin icon 63b.

The projector 100 detects a selection operation to select the pin icon 63a or the pin icon 63b by the pointing unit 3, based on picked-up image data from the image pickup unit 105.

When the pin icon 63a displayed in the sub screen 60a is selected by the selection operation, the projector 100 stores the image based on the image signal A into the capture memory 139. When the icon displayed in the sub screen 60b is selected by the selection operation, the projector 100 stores the image based on the image signal B into the capture memory 139. Subsequently, the projector 100 displays the capture image stored in the capture memory 139 onto the screen SC.

Thus, when images based on a plurality of image signals are displayed on a display surface, an image to be captured into the capture memory 139 can be selected by a simple operation using the pointing unit 3.

The projector 100 detects an operation to designate a position and size of the display area 70 where the capture image stored in the capture memory 139 is displayed, based on an operation of the pointing unit 3.

On detecting the operation to designate a position and size on the screen SC with which the capture image is displayed, based on the operation of the pointing unit 3, the projector 100 sets the display area 70 having the position and size designated by the detected operation, in the frame memory 137. The projector 100 displays the capture image in the display area 70 set in the frame memory 137.

Thus, a position and size on the screen SC with which the capture image is displayed can be designated, based on an operation of the pointing unit 3.

When the pin icon 63 is selected by a selection operation, the projector 100 changes the display form of the selected pin icon 63 from the display state representing the pinned state to the display state representing the unpinned state.

This enables the user to recognize whether the pin icon 63 is in the pinned state or in the unpinned state.

When an instruction signal giving an instruction to display an image is inputted from the external device 180A supplying the image signal A to the projector 100, the projector 100 determines that the pin icon 63a displayed in the sub screen 60a is selected.

When an instruction signal giving an instruction to display an image is inputted from the external device 180B supplying the image signal B to the projector 100, the projector 100 determines that the pin icon 63b displayed in the sub screen 60b is selected.

Thus, an image to be displayed in the display area 70 on the screen SC can be selected, based on an operation of the external device 180.

The projector 100 causes the image pickup unit 105 provided in the projector 100 to pick up an image of the screen SC and to generate picked-up image data. The projector 100 detects a selection operation, based on the pointed position pointed by the pointing unit 3 picked up in the generated picked-up image data, and the display position of the pin icon 63 on the screen SC.

Thus, an operation to select the pin icon 63 by the pointing unit 3 can be accurately detected by a simple configuration.

Second Embodiment

A second embodiment will now be described with reference to the accompanying drawings.

The configuration of the projector 100 according to the second embodiment is the same as the configuration of the projector 100 according to the first embodiment shown in FIG. 2. Therefore, the configuration of the projector 100 will not be described further.

Figure 12:
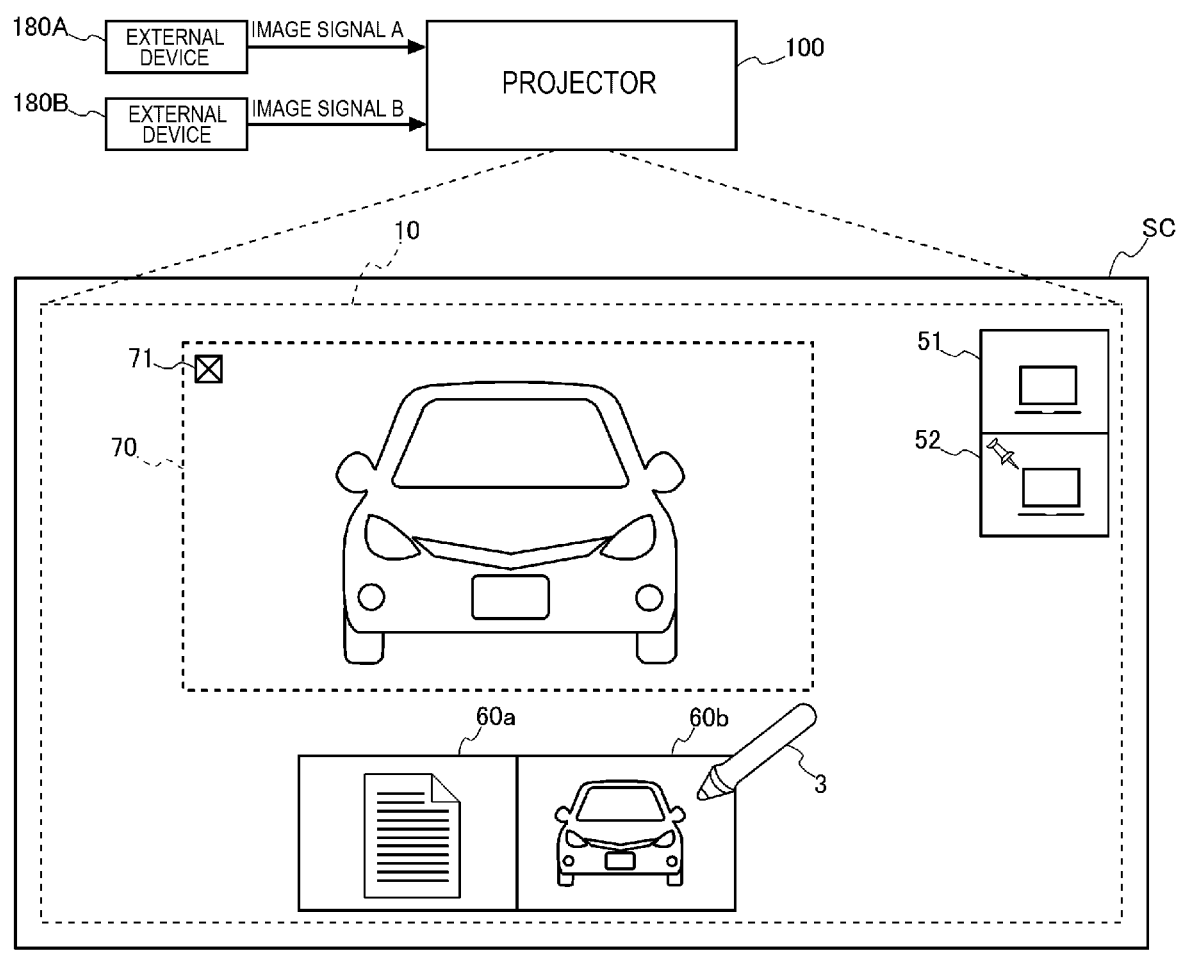
FIG. 12 shows a display image displayed on the screen in a second embodiment.

In the second embodiment, a delete button 71 is displayed in the display area 70 on the screen SC, as shown in FIG. 12. The delete button 71 is a button to delete the capture image displayed in the display area 70, from the display area 70. When an operation of the delete button 71 is detected, the control unit 150 deletes the capture image stored in the capture memory 139.

Also, when an operation of the delete button 71 is detected, the control unit 150 stores the capture data stored in the capture memory 139 into the memory 160. Subsequently, on accepting an operation from the user, the control unit 150 reads out the capture data from the memory 160 again and loads the read-out capture data into the frame memory 137. The capture data loaded in the frame memory 137 is read out by the image processing unit 135 and inputted to the light modulation device drive circuit 123. The capture image is loaded into the light modulation device. Thus, the capture image is displayed on the screen SC.

When the delete button 71 is selected and the capture image loaded in the frame memory 137 is deleted, the display form of the pin icon 63 in the sub screen 60 displaying the thumbnail image corresponding to the capture image is changed. Specifically, the display form is changed from the first display form, which is the pinned state with the pin icon 63, to the second display form, which is the unpinned state with the pin icon 63.

As the pin icon 63 is changed into the unpinned state, the control unit 150 changes the thumbnail image in the sub screen 60 where this pin icon 63 is displayed, to an image corresponding to an input image. Thus, selecting the pin icon 63 again enables a new image to be captured and displayed in the display area 70.

Figure 13:
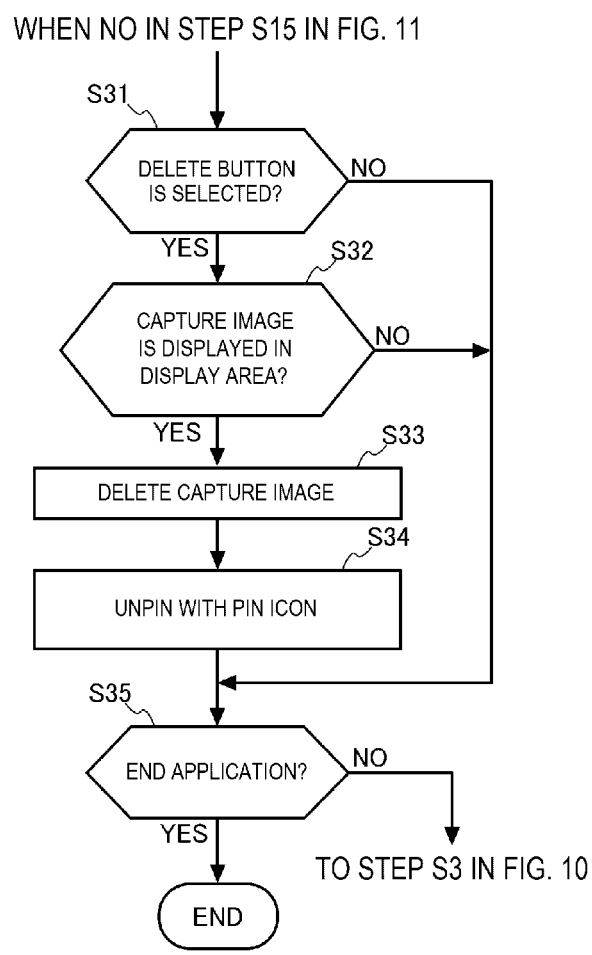
FIG. 13 is a flowchart showing operations of the projector in the second embodiment.

FIG. 13 is a flowchart showing the operations of the projector 100 according to this embodiment. The operations of the projector 100 according to this embodiment will now be described with reference to the flowchart shown in FIG. 13.

In the first embodiment, when the result of the determination in step S15 in the flowchart shown in FIG. 11 is negative, the control unit 150 shifts to the determination in step S26 and determines whether an operation to end the image capture app is accepted or not. In the second embodiment, when the result of the determination in step S15 is negative (NO in step S15), the control unit 150 determines whether the delete button 71 is selected by the pointing unit 3 or not (step S31).

When the delete button 71 is selected by the pointing unit 3 (YES in step S31), the control unit 150 determines whether a capture image is displayed in the display area 70 where the delete button 71 is selected, or not (step S32). When a capture image is not displayed in the display area 70 (NO in step S32), the control unit 150 shifts to the determination in step S35.

When a capture image is displayed in the display area 70 (YES in step S32), the control unit 150 deletes the capture image displayed in the display area 70 where the delete button 71 is selected (step S33). The control unit 150 also changes the display form of the pin icon 63 in the sub screen 60 where the thumbnail image of the capture image is displayed, to the unpinned state, and thus unpins the image (step S34).

When the delete button 71 is not selected (NO in step S31), when a capture image is not displayed in the display area 70 (NO in step S32), or when the image is unpinned with the pin icon 63, the control unit 150 determines whether an operation to end the image capture app is accepted or not (step S35). When an operation to end the image capture app is not accepted (NO in step S35), the control unit 150 returns to step S3 in FIG. 10. Meanwhile, when an operation to end the image capture app is accepted (YES in step S35), the control unit 150 ends this processing flow.

The second embodiment can achieve the following effects in addition to the effects achieved by the first embodiment.

The projector 100 according to the second embodiment changes the display form of the pin icon 63 from the display state representing the pinned state to the display state representing the unpinned state, when an operation to delete the capture image displayed in the display area 70 is detected.

Therefore, the display form of the pin icon 63 is changed, based on an operation to delete the capture image. This can reduce the time and effort of changing the image displayed in the sub screen 60.

Third Embodiment

In the first and second embodiments, the case where an image to be displayed in the display area 70 is selected by an operation of the pointing unit 3 is described. In this third embodiment, the case where an image to be displayed in the display area 70 is selected by an operation of an external device coupled to the projector 100 is described.

In the third embodiment, the case where the device coupled to the projector 100 and supplying an image signal to the projector 100 is a mobile device 200 such as a smartphone or tablet and where the projector 100 and the mobile device 200 are coupled via wireless communication is described.

Figure 14:
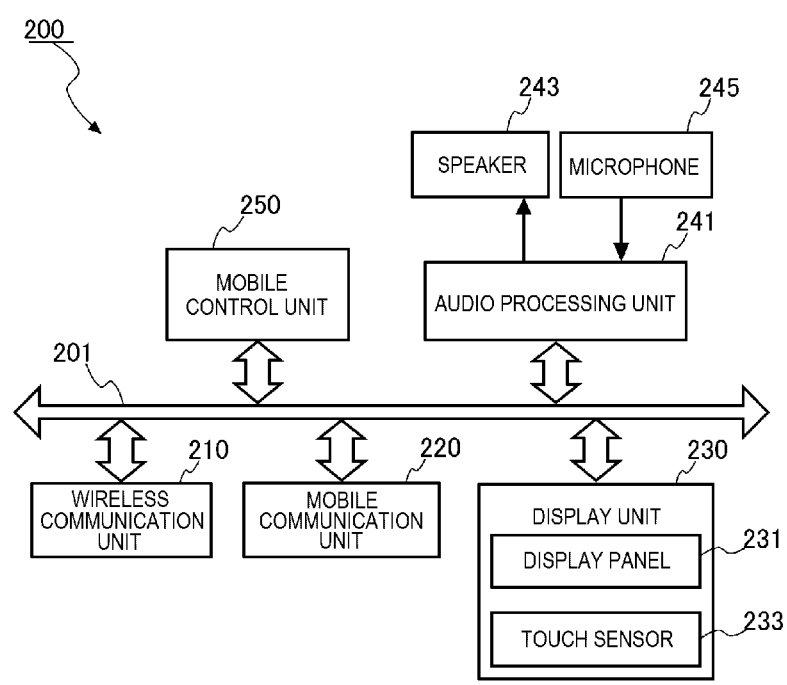
FIG. 14 is a block diagram showing the configuration of a mobile device in a third embodiment.

FIG. 14 is a block diagram showing the configuration of the mobile device 200.

FIG. 14 shows the configuration where the mobile device 200 is a smartphone. The mobile device 200 has a wireless communication unit 210, a mobile communication unit 220, a display unit 230, an audio processing unit 241, and a mobile control unit 250. These units are coupled to a bus 201.

The wireless communication unit 210 performs wireless LAN communication in conformity with a predetermined wireless LAN standard, with a wireless LAN access point or an external device that can perform wireless LAN communication.

The mobile communication unit 220 has an antenna, a wireless communication circuit, and the like, and performs mobile communication via a mobile communication network. The communication system of the mobile communication unit 220 may be the third-generation mobile telecommunication system, LTE (Long Term Evolution), or the fourth-generation mobile telecommunication system. LTE is a registered trademark.

The display unit 230 has a display panel 231 and a touch sensor 233.

The display panel 231 is formed of a liquid crystal panel or organic EL display. The display unit 230 displays an image on the display panel 231 under the control of the mobile control unit 250.

The touch sensor 233 detects a position on the display panel 231 touched by the user's finger or a touch pen and outputs coordinate information representing the detected touch position to the mobile control unit 250.

The audio processing unit 241 is coupled to a speaker 243 and a microphone 245 and modulates/demodulates an audio signal. The audio processing unit 241 modulates an audio signal inputted from the microphone 245 and outputs the modulated audio signal to the mobile control unit 250. The audio processing unit 241 also demodulates an audio signal and outputs the demodulated audio signal to the speaker 243. The audio processing unit 241 is implemented, for example, by a processor for audio processing.

The mobile control unit 250 is a computer device having a memory and a processor. The memory is a non-volatile storage device such as a flash memory or EEPROM (electrically erasable and programmable read-only memory). The memory may also be formed of an SD memory card or USB memory. The memory stores a control program such as an OS (operating system) or application program.

The processor is an arithmetic processing device formed of a CPU (central processing unit) or microcomputer. The processor executes the control program stored in the memory and controls each part of the mobile device 200. The processor may be formed of a single processor or can be formed of a plurality of processors. The processor may also be formed of an SoC integrated with a part or the entirety of the memory or another circuit. The processor may also be formed of a combination of a CPU executing a program and a DSP executing predetermined arithmetic processing. Also, all the functions of the processor may be installed in hardware. A programmable device may be used as well.

FIGS. 15 and 16 show a display image displayed on the screen SC by the projector 100. The operations of the projector 100 according to the third embodiment will now be described with reference to FIGS. 15 and 16.

First, a case in which a mobile device 200*a* as an example of the mobile device 200 is wirelessly coupled to the projector 100 is described. When the mobile device 200*a* is wirelessly coupled to the projector 100, the mobile device 200*a* transmits packet data including image data to the projector 100. On receiving the packet data from the wirelessly coupled mobile device 200*a*, the projector 100 demodulates the received packet data and extracts the image data from the demodulated packet data.

Next, the projector 100 displays the sub screen 60*a* on the screen SC and displays a thumbnail image of an image based on the extracted image data, in the sub screen 60*a*. The pin icon 63*a* is displayed in the sub screen 60*a*. FIG. 15 shows the state where the sub screen 60*a* is displayed on the screen SC. The display form of the pin icon 63*a* is the unpinned state.

Next, it is assumed that a mobile device 200*b* is wirelessly coupled to the projector 100 and that the projector 100 receives packet data from the mobile device 200*b*, as shown in FIG. 16. In this case, the projector 100 demodulates the received packet data and extracts image data from the demodulated packet data.

The projector 100 displays the sub screen 60b next to the sub screen 60a. The sub screen 60b is a sub screen where a thumbnail image of an image based on the image data received from the newly coupled mobile device 200b is displayed.

The projector 100 is wirelessly coupled to the mobile device 200, and adds a display of the sub screen 60 into the projection area 10 every time the projector 100 receives image data from the coupled mobile device 200. When a plurality of sub screens 60 are displayed in the projection area 10, the plurality of sub screens 60 may be displayed in such a way that the sub screens 60 are arranged in the order of reception of image data by the projector 100 or in the order of coupling with the projector 100. This makes it easier for the user of the mobile device 200 to recognize the sub screen 60 where the image from the user's own mobile device 200 is displayed.

In the third embodiment, the display area 70 may be displayed when the image capture app is selected and started. Alternatively, one of the users of the plurality of mobile devices 200 may set the display area 70 by operating the pointing unit 3.

When an image displayed on the mobile device 200 is displayed as a thumbnail image in the sub screen 60, the user carries out a gesture operation to the mobile device 200 and thus pins the thumbnail image displayed in the sub screen 60. For example, the user touches the display panel 231 of the mobile device 200 with a finger and carries out a swipe operation in which the user moves the finger touching the display panel 231 upward from the bottom. On detecting the swipe operation, the mobile device 200 transmits a signal indicating the swipe operation to the projector 100. This signal indicating the swipe operation is equivalent to the "instruction signal giving an instruction to display an image". On receiving the signal indicating the swipe operation from the mobile device 200, the projector 100 stores an image based on image data from the mobile device 200 receiving this signal, into the capture memory 139, and generates capture data. The projector 100 loads an image based on the generated capture data into an area corresponding to the display area 70 in the frame memory 137 and displays the image in the display area 70 on the screen SC.

The foregoing embodiments are simply examples of specific forms of applying the present disclosure and therefore should not limit the present disclosure. The present disclosure can be applied in different forms.

For example, while the projector 100 is described in the embodiments as an example of the display device, the display device according to the present disclosure may be a liquid crystal display. Also, a display device having a plasma display panel or organic EL panel may be employed.

When the method for controlling the display device is implemented using a computer provided in the display device, a program executed by the computer may be configured in the form of a recording medium or a transmission medium transmitting the program. The recording medium can be a magnetic or optical recording medium, or a semiconductor memory device. Specifically, a portable or fixed recording medium such as a flexible disk, HDD (hard disk drive), CD-ROM (compact disk read-only memory), DVD (digital versatile disk), Blu-ray disc, magneto-optical disk, flash memory, or card-type recording medium can be employed. The recording medium may also be a non-volatile storage device such as a RAM (random-access memory), ROM (read-only memory), or HDD, which are internal storage devices provided in the image display device. Blu-ray is a registered trademark.

The processing steps in the flowcharts shown in FIGS. 10, 11, and 13 are provided by division according to the main processing contents in order to facilitate understanding of the processing by the control unit 150. Therefore, the way of dividing the processing into the processing steps in the flowcharts shown in FIGS. 10, 11, and 13, and the names of the processing steps, do not limit the present disclosure. The processing by the control unit 150 can be divided into more processing steps according to the processing contents, or can be divided in such away that one processing step includes more processing. The orders of processing in the flowcharts are not limited to the illustrated examples, either.

At least a part of the functional blocks in the projector 100 shown in FIG. 2 may be implemented by hardware or by a collaboration of hardware and software. Also, the configuration in which independent hardware resources are arranged as shown in FIG. 2 is not limiting. A configuration having a functional unit other than the illustrated functional units may be employed as well.

What is claimed is:

1. A method for controlling a display device, the method comprising:
    receiving a first image signal from a first external device and displaying an image based on the first image signal in a first screen on a display surface along with a first icon;
    receiving a second image signal from a second external device and displaying an image based on the second image signal in a second screen on the display surface along with a second icon;
    detecting a selection operation to select the first icon or the second icon;
    storing the image based on the first image signal into a storage unit when the first icon is selected by the selection operation, and storing the image based on the second image signal into the storage unit when the second icon is selected by the selection operation; and
    displaying the image stored in the storage unit onto the display surface together with and in addition to the image displayed in the first screen and the image displayed in the second screen.

2. The method for controlling the display device according to claim 1, wherein
    a designation of a position and a size of a display area where the image stored in the storage unit is displayed is accepted, and
    the display area is set based on the designation that is accepted, and the image stored in the storage unit is displayed in the display area that is set.

3. The method for controlling the display device according to claim 2, wherein
    a display form of the first icon or the second icon selected by the selection operation is changed from a first display form that is a display form before the first icon or the second icon is selected by the selection operation, to a second display form that is different from the first display form.

4. The method for controlling the display device according to claim 3, wherein
    when an operation to delete the image displayed in the display area is detected, the first icon or the second icon changed to the second display form is changed to the first display form.

5. The method for controlling the display device according to claim 1, wherein
    it is determined that the first icon is selected, when an instruction signal giving an instruction to display an image is inputted from an external device supplying the first image signal to the display device, and it is determined that the second icon is selected, when an instruction signal giving an instruction to display an image is inputted from an external device supplying the second image signal to the display device.

6. The method for controlling the display device according to claim 1, wherein an image of the display surface is picked up to generate picked-up image data by an image pickup unit provided in the display device, and the selection operation is detected, based on a pointed position pointed by a pointing unit on the display surface specified based on the picked-up image data that is generated, and a display position of the first icon and the second icon on the display surface.

7. A display device displaying an image on a display surface, the display device comprising:

an input unit that receives a first image signal from a first external device and receives a second image signal from a second external device;

a control unit that, when the first image signal and the second image signal are inputted to the input unit, displays an image based on the first image signal in a first screen on the display surface along wiht a first icon, and displays an image based on the second image signal in a second screen on the display surface along with a second icon;

a detection unit that detects an operation to select one of the first icon and the second icon displayed respectively in the first screen and the second screen; and a storage unit, wherein when the operation to select the icon is detected, the control unit stores the image displayed in the screen where the icon selected by the operation is displayed, into the storage unit, and the control unit displays the image stored in the storage unit, onto the display surface together with and in addition to the image displayed in the first screen and the image displayed in the second screen.

* * * * *